United States Patent
Oakes, III et al.

(10) Patent No.: US 10,417,617 B1
(45) Date of Patent: *Sep. 17, 2019

(54) SYSTEMS AND METHODS FOR REMOTE DEPOSIT OF CHECKS

(71) Applicant: United Services Automobile Association (USAA), San Antonio, TX (US)

(72) Inventors: Charles Lee Oakes, III, San Antonio, TX (US); Randy Ray Morlen, San Antonio, TX (US); Bharat Prasad, San Antonio, TX (US); Troy Bartlette Huth, La Vernia, TX (US)

(73) Assignee: UNITED SERVICES AUTOMOBILE ASSOCIATION (USAA), San Antonio, TX (US)

(*) Notice: Subject to any disclaimer, the term of this patent is extended or adjusted under 35 U.S.C. 154(b) by 273 days.

This patent is subject to a terminal disclaimer.

(21) Appl. No.: 14/952,625

(22) Filed: Nov. 25, 2015

Related U.S. Application Data

(63) Continuation of application No. 14/220,799, filed on Mar. 20, 2014, now Pat. No. 9,224,136, which is a continuation of application No. 13/765,412, filed on Feb. 12, 2013, now Pat. No. 8,732,081, which is a continuation of application No. 12/963,513, filed on Dec. 8, 2010, now Pat. No. 8,392,332, which is a continuation of application No. 11/591,247, filed on Oct. 31, 2006, now Pat. No. 7,873,200.

(51) Int. Cl.
*G06Q 20/42* (2012.01)
*G06Q 20/04* (2012.01)
*G06K 9/18* (2006.01)

(52) U.S. Cl.
CPC .......... *G06Q 20/042* (2013.01); *G06K 9/186* (2013.01)

(58) Field of Classification Search
CPC ....................................................... G06Q 40/00
See application file for complete search history.

(56) References Cited

U.S. PATENT DOCUMENTS

| | | | |
|---|---|---|---|
| 1,748,489 A | 2/1930 | McCarthy et al. | |
| 2,292,825 A | 8/1942 | Dilks et al. | |
| 3,005,282 A | 10/1961 | Christiansen | |

(Continued)

FOREIGN PATENT DOCUMENTS

| | | |
|---|---|---|
| EP | 0 984 410 A1 | 3/2000 |
| EP | 1 855 459 A2 | 5/2007 |

(Continued)

OTHER PUBLICATIONS

All My Papers, Combing Remote Capture and IRD Printing a Check 21 Strategy for Community and Regional Banks by Bill Lange 25 pages Aug. 2005 (Year: 2005).*

(Continued)

*Primary Examiner* — Bruce I Ebersman
(74) *Attorney, Agent, or Firm* — Brinks, Gilson & Lione

(57) ABSTRACT

Remote deposit of checks can be facilitated by a financial institution. A customer's general purpose computer and image capture device may be leveraged to capture an image of a check and deliver the image to financial institution electronics. Additional data for the transaction may be collected as necessary. The transaction can be automatically accomplished utilizing the images and data thus acquired.

20 Claims, 6 Drawing Sheets

(56) References Cited

U.S. PATENT DOCUMENTS

| | | |
|---|---|---|
| 3,341,820 A | 9/1967 | Grillmeier, Jr. et al. |
| 3,576,972 A | 5/1971 | Wood |
| 3,593,913 A | 7/1971 | Bremer |
| 3,620,553 A | 11/1971 | Donovan |
| 3,648,242 A | 3/1972 | Grosbard |
| 3,800,124 A | 3/1974 | Walsh |
| 3,816,943 A | 6/1974 | Henry |
| 4,002,356 A | 1/1977 | Weidmann |
| 4,027,142 A | 5/1977 | Paup et al. |
| 4,060,711 A | 11/1977 | Buros |
| 4,070,649 A | 1/1978 | Wright, Jr. et al. |
| 4,128,202 A | 12/1978 | Buros |
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,346,442 A | 8/1982 | Musmanno |
| 4,417,136 A | 11/1983 | Rushby et al. |
| 4,433,436 A | 2/1984 | Carnes |
| 4,454,610 A | 6/1984 | Sziklai |
| RE31,692 E | 10/1984 | Tyburski et al. |
| 4,523,330 A | 6/1985 | Cain |
| 4,636,099 A | 1/1987 | Goldstone |
| 4,640,413 A | 2/1987 | Kaplan |
| 4,644,144 A | 2/1987 | Chandek |
| 4,722,444 A | 2/1988 | Murphy et al. |
| 4,722,544 A | 2/1988 | Weber |
| 4,727,435 A | 2/1988 | Otani et al. |
| 4,737,911 A | 4/1988 | Freeman |
| 4,739,411 A | 4/1988 | Bolton |
| 4,774,574 A | 9/1988 | Daly et al. |
| 4,774,663 A | 9/1988 | Musmanno |
| 4,790,475 A | 12/1988 | Griffin |
| 4,806,780 A | 2/1989 | Yamamoto |
| 4,837,693 A | 6/1989 | Schotz |
| 4,890,228 A | 12/1989 | Longfield |
| 4,927,071 A | 5/1990 | Wood |
| 4,934,587 A | 6/1990 | McNabb |
| 4,960,981 A | 10/1990 | Benton |
| 4,975,735 A | 12/1990 | Bright |
| 5,022,683 A | 6/1991 | Barbour |
| 5,053,607 A * | 10/1991 | Carlson ............... G06K 17/00 235/379 |
| 5,077,805 A | 12/1991 | Tan |
| 5,091,968 A | 2/1992 | Higgins et al. |
| 5,122,950 A | 6/1992 | Benton et al. |
| 5,134,564 A | 7/1992 | Dunn et al. |
| 5,146,606 A | 9/1992 | Grondalski |
| 5,157,620 A | 10/1992 | Shaar |
| 5,159,548 A | 10/1992 | Caslavka |
| 5,164,833 A | 11/1992 | Aoki |
| 5,175,682 A | 12/1992 | Higashiyama et al. |
| 5,187,750 A | 2/1993 | Behera |
| 5,191,525 A | 3/1993 | LeBrun |
| 5,193,121 A | 3/1993 | Elischer et al. |
| 5,220,501 A | 6/1993 | Lawlor |
| 5,227,863 A | 7/1993 | Bilbrey et al. |
| 5,229,589 A | 7/1993 | Schneider |
| 5,233,547 A | 8/1993 | Kapp et al. |
| 5,237,158 A | 8/1993 | Kern et al. |
| 5,237,159 A | 8/1993 | Stephens |
| 5,237,620 A | 8/1993 | Deaton et al. |
| 5,257,320 A | 10/1993 | Etherington et al. |
| 5,265,008 A | 11/1993 | Benton |
| 5,268,968 A | 12/1993 | Yoshida |
| 5,283,829 A | 2/1994 | Anderson |
| 5,321,816 A | 6/1994 | Rogan |
| 5,345,090 A | 9/1994 | Hludzinski |
| 5,347,302 A | 9/1994 | Simonoff |
| 5,350,906 A | 9/1994 | Brody |
| 5,373,550 A | 12/1994 | Campbell |
| 5,383,113 A | 1/1995 | Kight et al. |
| 5,419,588 A | 5/1995 | Wood |
| 5,422,467 A | 6/1995 | Graef |
| 5,444,616 A | 8/1995 | Nair et al. |
| 5,444,794 A | 8/1995 | Uhland, Sr. |
| 5,455,875 A | 10/1995 | Chevion et al. |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,530,773 A | 6/1996 | Thompson |
| 5,577,179 A | 11/1996 | Blank |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Ray et al. |
| 5,677,955 A | 10/1997 | Doggett |
| 5,678,046 A | 10/1997 | Cahill et al. |
| 5,679,938 A | 10/1997 | Templeton |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,751,842 A | 5/1998 | Riach |
| 5,761,686 A | 6/1998 | Bloomberg |
| 5,784,503 A | 7/1998 | Bleecker, III et al. |
| 5,830,609 A | 11/1998 | Warner |
| 5,832,463 A | 11/1998 | Funk |
| 5,838,814 A | 11/1998 | Moore |
| 5,848,185 A | 12/1998 | Koga et al. |
| 5,859,935 A | 1/1999 | Johnson et al. |
| 5,863,075 A | 1/1999 | Rich |
| 5,870,456 A | 2/1999 | Rogers |
| 5,870,724 A | 2/1999 | Lawlor |
| 5,870,725 A | 2/1999 | Bellinger et al. |
| 5,878,337 A | 3/1999 | Joao |
| 5,889,884 A | 3/1999 | Hashimoto et al. |
| 5,893,101 A | 4/1999 | Balogh et al. |
| 5,897,625 A | 4/1999 | Gustin |
| 5,898,157 A | 4/1999 | Mangili et al. |
| 5,901,253 A | 5/1999 | Tretter |
| 5,903,878 A | 5/1999 | Talati |
| 5,903,881 A | 5/1999 | Schrader |
| 5,910,988 A | 6/1999 | Ballard |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin et al. |
| 6,012,048 A | 1/2000 | Gustin et al. |
| 6,014,454 A | 1/2000 | Kunkler |
| 6,021,202 A | 2/2000 | Anderson |
| 6,021,397 A | 2/2000 | Jones |
| 6,023,705 A | 2/2000 | Bellinger et al. |
| 6,029,887 A | 2/2000 | Furuhashi |
| 6,030,000 A | 2/2000 | Diamond |
| 6,032,137 A | 2/2000 | Ballard |
| 6,038,553 A | 3/2000 | Hyde |
| 6,053,405 A | 4/2000 | Irwin, Jr. et al. |
| 6,059,185 A | 5/2000 | Funk et al. |
| 6,064,762 A | 5/2000 | Haenel |
| 6,072,941 A | 6/2000 | Suzuki et al. |
| 6,073,119 A | 6/2000 | Borenmisza-wahr |
| 6,073,121 A | 6/2000 | Ramzy |
| 6,085,168 A | 7/2000 | Mori |
| 6,086,708 A | 7/2000 | Colgate |
| 6,089,450 A | 7/2000 | Koeple |
| 6,089,610 A | 7/2000 | Greene |
| 6,092,047 A | 7/2000 | Hyman et al. |
| 6,097,834 A | 8/2000 | Krouse |

(56) References Cited

U.S. PATENT DOCUMENTS

| | | |
|---|---|---|
| 6,097,845 A | 8/2000 | Ng et al. |
| 6,097,885 A | 8/2000 | Rayner |
| 6,105,865 A | 8/2000 | Hardesty |
| 6,128,603 A | 10/2000 | Dent et al. |
| 6,141,339 A | 10/2000 | Kaplan et al. |
| 6,145,738 A | 11/2000 | Stinson et al. |
| 6,148,102 A | 11/2000 | Stolin |
| 6,149,056 A | 11/2000 | Stinson et al. |
| 6,151,409 A | 11/2000 | Chen et al. |
| 6,151,423 A | 11/2000 | Melen |
| 6,151,426 A | 11/2000 | Lee |
| 6,159,585 A | 12/2000 | Rittenhouse |
| 6,170,744 B1 | 1/2001 | Lee |
| 6,178,409 B1 | 1/2001 | Weber et al. |
| 6,181,837 B1 | 1/2001 | Cahill et al. |
| 6,188,506 B1 | 2/2001 | Kaiserman |
| 6,189,785 B1 | 2/2001 | Lowery |
| 6,192,165 B1 | 2/2001 | Irons |
| 6,195,694 B1 | 2/2001 | Chen et al. |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,523 B1 | 8/2001 | Tedesco et al. |
| 6,282,826 B1 | 9/2001 | Richards |
| 6,293,469 B1 | 9/2001 | Masson et al. |
| 6,304,860 B1 | 10/2001 | Martin |
| 6,310,647 B1 | 10/2001 | Parulski et al. |
| 6,314,452 B1 | 11/2001 | Dekel |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,339,766 B1 | 1/2002 | Gephart |
| 6,351,553 B1 | 2/2002 | Hayosh |
| 6,351,735 B1 | 2/2002 | Deaton et al. |
| 6,354,490 B1 | 3/2002 | Weiss et al. |
| 6,363,162 B1 | 3/2002 | Moed et al. |
| 6,363,164 B1 | 3/2002 | Jones et al. |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 | 6/2002 | Wesolkowski et al. |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,439,454 B1 | 8/2002 | Masson et al. |
| 6,449,397 B1 | 9/2002 | Che-Chu |
| 6,450,403 B1 | 9/2002 | Martens et al. |
| 6,463,220 B1 | 10/2002 | Dance et al. |
| 6,464,134 B1 | 10/2002 | Page |
| 6,469,745 B1 | 10/2002 | Yamada et al. |
| 6,470,325 B1 | 10/2002 | Leemhuis |
| 6,473,519 B1 | 10/2002 | Pidhirny et al. |
| 6,502,747 B1 | 1/2003 | Stoutenburg et al. |
| 6,505,178 B1 | 1/2003 | Flenley |
| 6,546,119 B2 | 4/2003 | Ciolli et al. |
| 6,574,377 B1 | 6/2003 | Cahill et al. |
| 6,574,609 B1 | 6/2003 | Downs |
| 6,578,760 B1 | 6/2003 | Otto |
| 6,587,837 B1 | 7/2003 | Spagna |
| 6,606,117 B1 | 8/2003 | Windle |
| 6,609,200 B2 | 8/2003 | Anderson |
| 6,611,598 B1 | 8/2003 | Hayosh |
| 6,614,930 B1 | 9/2003 | Agnihotri et al. |
| 6,643,416 B1 | 11/2003 | Daniels |
| 6,647,136 B2 | 11/2003 | Jones et al. |
| 6,654,487 B1 | 11/2003 | Downs, Jr. |
| 6,661,910 B2 | 12/2003 | Jones et al. |
| 6,669,086 B2 | 12/2003 | Abdi et al. |
| 6,672,452 B1 | 1/2004 | Alves |
| 6,682,452 B2 | 1/2004 | Quintus |
| 6,695,204 B1 | 2/2004 | Stinson |
| 6,711,474 B1 | 3/2004 | Treyz et al. |
| 6,726,097 B2 | 4/2004 | Graef |
| 6,728,397 B2 | 4/2004 | McNeal |
| 6,738,496 B1 | 5/2004 | Van Hall |
| 6,742,128 B1 | 5/2004 | Joiner |
| 6,745,186 B1 | 6/2004 | Testa et al. |
| 6,754,640 B2 | 6/2004 | Bozeman |
| 6,755,340 B1 | 6/2004 | Voss et al. |
| 6,760,414 B1 | 7/2004 | Schurko et al. |
| 6,760,470 B1 | 7/2004 | Bogosian et al. |
| 6,763,226 B1 | 7/2004 | McZeal |
| 6,781,962 B1 | 8/2004 | Williams |
| 6,786,398 B1 | 9/2004 | Stinson et al. |
| 6,789,054 B1 | 9/2004 | Makhlouf |
| 6,796,489 B2 | 9/2004 | Slater et al. |
| 6,796,491 B2 | 9/2004 | Nakajima |
| 6,806,903 B1 | 10/2004 | Okisu et al. |
| 6,813,733 B1 | 11/2004 | Li |
| 6,829,704 B2 | 12/2004 | Zhang |
| 6,844,885 B2 | 1/2005 | Anderson |
| 6,856,965 B1 | 2/2005 | Stinson |
| 6,863,214 B2 | 3/2005 | Garner et al. |
| 6,870,947 B2 | 3/2005 | Kelland |
| 6,873,728 B2 | 3/2005 | Bernstein et al. |
| 6,883,140 B1 | 4/2005 | Acker |
| 6,898,314 B2 | 5/2005 | Kung et al. |
| 6,902,105 B2 | 6/2005 | Koakutsu |
| 6,910,023 B1 | 6/2005 | Schibi |
| 6,913,188 B2 | 7/2005 | Wong |
| 6,931,255 B2 | 8/2005 | Mekuria |
| 6,931,591 B1 | 8/2005 | Brown |
| 6,934,719 B2 | 8/2005 | Nally |
| 6,947,610 B2 | 9/2005 | Sun |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones et al. |
| 6,999,943 B1 | 2/2006 | Johnson |
| 7,003,040 B2 | 2/2006 | Yi |
| 7,004,382 B2 | 2/2006 | Sandru |
| 7,010,155 B2 | 3/2006 | Koakutsu et al. |
| 7,010,507 B1 | 3/2006 | Anderson |
| 7,016,704 B2 | 3/2006 | Pallakoff |
| 7,027,171 B1 | 4/2006 | Watanabe |
| 7,028,886 B1 | 4/2006 | Maloney |
| 7,039,048 B1 | 5/2006 | Monta |
| 7,046,991 B2 | 5/2006 | Little |
| 7,051,001 B1 | 5/2006 | Slater |
| 7,058,036 B1 | 6/2006 | Yu |
| 7,062,099 B2 | 6/2006 | Li et al. |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,116,446 B2 | 10/2006 | Maurer |
| 7,117,171 B1 | 10/2006 | Pollin |
| 7,120,461 B2 | 10/2006 | Cho |
| 7,131,571 B2 | 11/2006 | Swift et al. |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan et al. |
| 7,184,980 B2 | 2/2007 | Allen-Rouman et al. |
| 7,185,805 B1 | 3/2007 | McShirley |
| 7,197,173 B2 | 3/2007 | Jones et al. |
| 7,200,255 B2 | 4/2007 | Jones |
| 7,204,412 B2 | 4/2007 | Foss, Jr. |
| 7,216,106 B1 | 5/2007 | Buchanan |
| 7,219,082 B2 | 5/2007 | Forte |

(56) References Cited

U.S. PATENT DOCUMENTS

| | | | |
|---|---|---|---|
| 7,219,831 B2 | 5/2007 | Murata |
| 7,245,765 B2 | 7/2007 | Myers et al. |
| 7,249,076 B1 | 7/2007 | Pendleton |
| 7,252,224 B2 | 8/2007 | Verma |
| 7,257,246 B1 | 8/2007 | Brodie et al. |
| 7,266,230 B2 | 9/2007 | Doran |
| 7,277,191 B2 | 10/2007 | Metcalfe et al. |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,331,523 B2 | 2/2008 | Meier et al. |
| 7,336,813 B2 | 2/2008 | Prakash et al. |
| 7,343,320 B1 | 3/2008 | Treyz |
| 7,349,566 B2 | 3/2008 | Jones et al. |
| 7,349,585 B2 | 3/2008 | Li |
| 7,356,505 B2 | 4/2008 | March |
| 7,369,713 B2 | 5/2008 | Suino |
| 7,377,425 B1 | 5/2008 | Ma |
| 7,379,978 B2 | 5/2008 | Anderson |
| 7,383,227 B2 | 6/2008 | Weinflash et al. |
| 7,385,631 B2 | 6/2008 | Maeno |
| 7,386,511 B2 | 6/2008 | Buchanan |
| 7,388,683 B2 | 6/2008 | Rodriguez et al. |
| 7,391,897 B2 | 6/2008 | Jones et al. |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,419,093 B1 | 9/2008 | Blackson et al. |
| 7,421,107 B2 | 9/2008 | Lugg |
| 7,421,410 B1 | 9/2008 | Schechtman et al. |
| 7,427,016 B2 | 9/2008 | Chimento |
| 7,433,098 B2 | 10/2008 | Klein et al. |
| 7,437,327 B2 | 10/2008 | Lam |
| 7,440,924 B2 * | 10/2008 | Buchanan | G06Q 20/042 235/379 |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,460,700 B2 | 12/2008 | Tsunachima et al. |
| 7,461,779 B2 | 12/2008 | Ramachandran |
| 7,461,780 B2 | 12/2008 | Potts |
| 7,464,859 B1 | 12/2008 | Hawkins |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Statou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,571,848 B2 | 8/2009 | Cohen |
| 7,577,614 B1 | 8/2009 | Warren et al. |
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,609,889 B2 | 10/2009 | Guo et al. |
| 7,619,721 B2 | 11/2009 | Jones |
| 7,620,231 B2 | 11/2009 | Jones |
| 7,620,604 B1 | 11/2009 | Bueche, Jr. |
| 7,630,518 B2 | 12/2009 | Frew et al. |
| 7,644,037 B1 | 1/2010 | Ostrovsky |
| 7,644,043 B2 | 1/2010 | Minowa |
| 7,647,275 B2 | 1/2010 | Jones |
| 7,668,363 B2 | 2/2010 | Price |
| 7,672,022 B1 | 3/2010 | Fan |
| 7,672,940 B2 | 3/2010 | Viola |
| 7,676,409 B1 | 3/2010 | Ahmad |
| 7,680,732 B1 | 3/2010 | Davies et al. |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder et al. |
| 7,714,778 B2 * | 5/2010 | Dupray | G01S 5/0268 342/357.31 |
| 7,720,735 B2 | 5/2010 | Anderson et al. |
| 7,734,545 B1 | 6/2010 | Fogliano |
| 7,743,979 B2 | 6/2010 | Fredman |
| 7,753,268 B1 | 7/2010 | Robinson et al. |
| 7,761,358 B2 | 7/2010 | Craig et al. |
| 7,766,244 B1 | 8/2010 | Field |
| 7,769,650 B2 | 8/2010 | Bleunven |
| 7,778,457 B2 | 8/2010 | Nepomniachtchi et al. |
| 7,792,752 B1 | 9/2010 | Kay |
| 7,792,753 B1 | 9/2010 | Slater et al. |
| 7,793,833 B2 | 9/2010 | Yoon et al. |
| 7,810,714 B2 | 10/2010 | Murata |
| 7,812,986 B2 | 10/2010 | Graham et al. |
| 7,818,245 B2 | 10/2010 | Prakash et al. |
| 7,831,458 B2 | 11/2010 | Neumann |
| 7,856,402 B1 | 12/2010 | Kay |
| 7,865,384 B2 | 1/2011 | Anderson et al. |
| 7,873,200 B1 * | 1/2011 | Oakes, III | G06Q 20/042 382/137 |
| 7,876,949 B1 * | 1/2011 | Oakes, III | G06Q 20/042 235/379 |
| 7,885,451 B1 | 2/2011 | Walls et al. |
| 7,885,880 B1 | 2/2011 | Prasad et al. |
| 7,894,094 B2 | 2/2011 | Nacman et al. |
| 7,895,054 B2 | 2/2011 | Slen et al. |
| 7,896,232 B1 | 3/2011 | Prasad et al. |
| 7,900,822 B1 | 3/2011 | Prasad et al. |
| 7,903,863 B2 | 3/2011 | Jones et al. |
| 7,904,386 B2 | 3/2011 | Kalra et al. |
| 7,912,785 B1 | 3/2011 | Kay |
| 7,935,441 B2 | 5/2011 | Tononishi |
| 7,949,587 B1 | 5/2011 | Morris et al. |
| 7,950,698 B2 | 5/2011 | Popadic et al. |
| 7,953,441 B2 | 5/2011 | Lors |
| 7,958,053 B2 | 6/2011 | Stone |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,979,326 B2 | 7/2011 | Kurushima |
| 7,996,312 B1 | 8/2011 | Beck et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,001,051 B1 | 8/2011 | Smith et al. |
| 8,045,784 B2 | 10/2011 | Price et al. |
| 8,046,301 B1 | 10/2011 | Smith et al. |
| 8,060,442 B1 | 11/2011 | Hecht et al. |

(56) References Cited

U.S. PATENT DOCUMENTS

| | | |
|---|---|---|
| 8,065,307 B2 | 11/2011 | Haslam et al. |
| 8,091,778 B1 | 1/2012 | Block et al. |
| 8,116,533 B2 | 2/2012 | Kiplinger et al. |
| 8,159,520 B1 | 4/2012 | Dhanoa |
| 8,203,640 B2 | 6/2012 | Kim et al. |
| 8,204,293 B2 | 6/2012 | Csulits et al. |
| 8,235,284 B1 | 8/2012 | Prasad et al. |
| 8,266,076 B2 | 9/2012 | Lopez et al. |
| 8,271,385 B2 | 9/2012 | Emerson et al. |
| 8,290,237 B1 | 10/2012 | Burks et al. |
| 8,313,020 B2 | 11/2012 | Ramachandran |
| 8,320,657 B1 | 11/2012 | Burks et al. |
| 8,332,329 B1 | 12/2012 | Thiele |
| 8,351,677 B1* | 1/2013 | Oakes, III .............. G06K 9/186 235/379 |
| 8,351,678 B1 | 1/2013 | Medina, III |
| 8,358,826 B1 | 1/2013 | Medina et al. |
| 8,364,563 B2 | 1/2013 | Choiniere, Sr. |
| 8,369,650 B2 | 2/2013 | Zanfir et al. |
| 8,374,963 B1 | 2/2013 | Billman |
| 8,391,599 B1 | 3/2013 | Medina, III |
| 8,392,332 B1 | 3/2013 | Oakes, III et al. |
| 8,401,962 B1 | 3/2013 | Bent et al. |
| 8,422,758 B1 | 4/2013 | Bueche, Jr. |
| 8,433,127 B1* | 4/2013 | Harpel .................. G06K 9/036 382/139 |
| 8,433,647 B1 | 4/2013 | Yarbrough |
| 8,452,689 B1 | 5/2013 | Medina, III |
| 8,464,933 B1 | 6/2013 | Prasad et al. |
| 8,538,124 B1 | 9/2013 | Harpel et al. |
| 8,542,921 B1 | 9/2013 | Medina |
| 8,548,267 B1 | 10/2013 | Yacoub et al. |
| 8,559,766 B2 | 10/2013 | Tilt et al. |
| 8,582,862 B2 | 11/2013 | Nepomniachtchi et al. |
| 8,611,635 B1 | 12/2013 | Medina, III |
| 8,660,952 B1 | 2/2014 | Viera et al. |
| 8,699,779 B1 | 4/2014 | Prasad et al. |
| 8,708,227 B1 | 4/2014 | Oakes, III et al. |
| 8,731,321 B2 | 5/2014 | Fujiwara et al. |
| 8,732,081 B1 | 5/2014 | Oakes, III et al. |
| 8,751,345 B1 | 6/2014 | Borzyche et al. |
| 8,751,356 B1 | 6/2014 | Garcia |
| 8,751,379 B1 | 6/2014 | Bueche, Jr. |
| 8,799,147 B1 | 8/2014 | Walls et al. |
| 8,837,806 B1 | 9/2014 | Ethington et al. |
| 8,843,405 B1 | 9/2014 | Hartman et al. |
| 8,959,033 B1 | 2/2015 | Oakes, III et al. |
| 8,977,571 B1 | 3/2015 | Bueche, Jr. et al. |
| 8,990,862 B1 | 3/2015 | Smith |
| 9,009,071 B1 | 4/2015 | Watson et al. |
| 9,036,040 B1 | 5/2015 | Danko |
| 9,058,512 B1 | 6/2015 | Medina, III |
| 9,064,284 B1 | 6/2015 | Janiszeski et al. |
| 9,129,340 B1 | 8/2015 | Medina, III et al. |
| 9,159,101 B1 | 10/2015 | Pollack et al. |
| 9,177,197 B1 | 11/2015 | Prasad et al. |
| 9,177,198 B1 | 11/2015 | Prasad et al. |
| 9,224,136 B1 | 12/2015 | Oakes, III et al. |
| 9,286,514 B1 | 3/2016 | Newman |
| 9,311,634 B1 | 4/2016 | Hildebrand |
| 9,336,517 B1 | 5/2016 | Prasad et al. |
| 9,390,339 B1 | 7/2016 | Danko |
| 9,401,011 B2 | 7/2016 | Medina, III et al. |
| 9,424,569 B1 | 8/2016 | Sherman et al. |
| 9,569,756 B1 | 2/2017 | Bueche, Jr. et al. |
| 9,619,872 B1 | 4/2017 | Medina, III et al. |
| 9,626,183 B1 | 4/2017 | Smith et al. |
| 9,626,662 B1 | 4/2017 | Prasad et al. |
| 9,779,392 B1 | 10/2017 | Prasad et al. |
| 9,779,452 B1 | 10/2017 | Medina et al. |
| 9,785,929 B1 | 10/2017 | Watson et al. |
| 9,792,654 B1 | 10/2017 | Limas et al. |
| 9,818,090 B1 | 11/2017 | Bueche, Jr. et al. |
| 9,886,642 B1 | 2/2018 | Danko |
| 9,892,454 B1 | 2/2018 | Pollack et al. |
| 9,898,778 B1 | 2/2018 | Pollack et al. |
| 9,898,808 B1 | 2/2018 | Medina, III et al. |
| 9,904,848 B1 | 2/2018 | Newman |
| 9,946,923 B1 | 4/2018 | Medina |
| 10,013,605 B1 | 7/2018 | Oakes, III et al. |
| 10,013,681 B1 | 7/2018 | Oakes, III et al. |
| 10,181,087 B1 | 1/2019 | Danko |
| 10,235,660 B1 | 3/2019 | Bueche, Jr. et al. |
| 10,325,420 B1 | 6/2019 | Moon |
| 10,354,235 B1 | 7/2019 | Medina |
| 2001/0004235 A1 | 6/2001 | Maloney |
| 2001/0014881 A1 | 8/2001 | Drummond |
| 2001/0016084 A1 | 8/2001 | Pollard et al. |
| 2001/0018739 A1 | 8/2001 | Anderson |
| 2001/0027994 A1 | 10/2001 | Hayashida |
| 2001/0037299 A1 | 11/2001 | Nichols et al. |
| 2001/0042171 A1 | 11/2001 | Vermeulen |
| 2001/0042785 A1 | 11/2001 | Walker |
| 2001/0043748 A1 | 11/2001 | Wesolkowski et al. |
| 2001/0047330 A1 | 11/2001 | Gephart |
| 2001/0054020 A1 | 12/2001 | Barth et al. |
| 2002/0001393 A1 | 1/2002 | Jones |
| 2002/0013767 A1 | 1/2002 | Katz |
| 2002/0016763 A1 | 2/2002 | March |
| 2002/0016769 A1 | 2/2002 | Barbara et al. |
| 2002/0023055 A1 | 2/2002 | Antognini et al. |
| 2002/0025085 A1 | 2/2002 | Gustafson et al. |
| 2002/0026418 A1 | 2/2002 | Koppel et al. |
| 2002/0032656 A1 | 3/2002 | Chen |
| 2002/0038289 A1 | 3/2002 | Lawlor et al. |
| 2002/0040340 A1 | 4/2002 | Yoshida |
| 2002/0052841 A1 | 5/2002 | Guthrie |
| 2002/0052853 A1 | 5/2002 | Munoz |
| 2002/0065786 A1 | 5/2002 | Martens et al. |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107767 A1 | 8/2002 | McClair et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0120582 A1 | 8/2002 | Elston et al. |
| 2002/0120846 A1* | 8/2002 | Stewart ................ G06Q 20/04 713/168 |
| 2002/0129249 A1 | 9/2002 | Maillard et al. |
| 2002/0130868 A1 | 9/2002 | Smith |
| 2002/0133409 A1 | 9/2002 | Sawano et al. |
| 2002/0138445 A1 | 9/2002 | Laage et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta et al. |
| 2002/0152170 A1 | 10/2002 | Dutta |
| 2002/0153414 A1 | 10/2002 | Stoutenburg et al. |
| 2002/0154127 A1 | 10/2002 | Vienneau et al. |
| 2002/0159648 A1 | 10/2002 | Alderson et al. |
| 2002/0169715 A1 | 11/2002 | Ruth et al. |
| 2002/0171820 A1 | 11/2002 | Okamura |
| 2002/0178112 A1 | 11/2002 | Goeller |
| 2002/0186881 A1 | 12/2002 | Li |
| 2002/0188564 A1 | 12/2002 | Star |
| 2002/0195485 A1 | 12/2002 | Pomerleau et al. |
| 2003/0005326 A1 | 1/2003 | Flemming |
| 2003/0009420 A1 | 1/2003 | Jones |
| 2003/0015583 A1 | 1/2003 | Abdi et al. |
| 2003/0018897 A1 | 1/2003 | Bellis, Jr. et al. |
| 2003/0023557 A1 | 1/2003 | Moore |
| 2003/0026609 A1 | 2/2003 | Parulski |
| 2003/0038227 A1 | 2/2003 | Sesek |
| 2003/0050889 A1 | 3/2003 | Burke |
| 2003/0053692 A1 | 3/2003 | Hong et al. |
| 2003/0055756 A1 | 3/2003 | Allan |

(56) References Cited

U.S. PATENT DOCUMENTS

| | | |
|---|---|---|
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0078883 A1 | 4/2003 | Stewart et al. |
| 2003/0081824 A1 | 5/2003 | Mennie |
| 2003/0086615 A1 | 5/2003 | Dance et al. |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown |
| 2003/0105714 A1 | 6/2003 | Alarcon-Luther et al. |
| 2003/0126078 A1 | 7/2003 | Vihinen |
| 2003/0126082 A1 | 7/2003 | Omura et al. |
| 2003/0130940 A1 | 7/2003 | Hansen et al. |
| 2003/0132384 A1 | 7/2003 | Sugiyama et al. |
| 2003/0133608 A1 | 7/2003 | Bernstein et al. |
| 2003/0133610 A1 | 7/2003 | Nagarajan et al. |
| 2003/0135457 A1 | 7/2003 | Stewart et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0187790 A1 | 10/2003 | Swift et al. |
| 2003/0191615 A1 | 10/2003 | Bailey |
| 2003/0191869 A1 | 10/2003 | Williams |
| 2003/0200107 A1 | 10/2003 | Allen et al. |
| 2003/0200174 A1 | 10/2003 | Star |
| 2003/0202690 A1 | 10/2003 | Jones et al. |
| 2003/0212904 A1 | 11/2003 | Randle et al. |
| 2003/0217005 A1 | 11/2003 | Drummond et al. |
| 2003/0218061 A1 | 11/2003 | Filatov |
| 2003/0225705 A1 | 12/2003 | Park et al. |
| 2003/0231285 A1 | 12/2003 | Ferguson |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0017482 A1 | 1/2004 | Weitman |
| 2004/0024626 A1 | 2/2004 | Bruijning |
| 2004/0024708 A1 | 2/2004 | Masuda |
| 2004/0029591 A1 | 2/2004 | Chapman et al. |
| 2004/0030741 A1 | 2/2004 | Wolton et al. |
| 2004/0044606 A1 | 3/2004 | Buttridge et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0075754 A1 | 4/2004 | Nakajima et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0111371 A1 | 6/2004 | Friedman |
| 2004/0117302 A1 | 6/2004 | Weichert |
| 2004/0122754 A1 | 6/2004 | Stevens |
| 2004/0133511 A1 | 7/2004 | Smith et al. |
| 2004/0133516 A1 | 7/2004 | Buchanan et al. |
| 2004/0138974 A1 | 7/2004 | Shimamura |
| 2004/0148235 A1 | 7/2004 | Craig et al. |
| 2004/0158549 A1 | 8/2004 | Matena |
| 2004/0165096 A1 | 8/2004 | Maeno |
| 2004/0170259 A1 | 9/2004 | Park |
| 2004/0184766 A1 | 9/2004 | Kim et al. |
| 2004/0201741 A1 | 10/2004 | Ban |
| 2004/0210515 A1 | 10/2004 | Hughes |
| 2004/0210523 A1 | 10/2004 | Gains et al. |
| 2004/0225604 A1 | 11/2004 | Foss, Jr. et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0015332 A1 | 1/2005 | Chen |
| 2005/0015342 A1 | 1/2005 | Murata et al. |
| 2005/0021466 A1* | 1/2005 | Buchanan ............ G06Q 20/042 705/42 |
| 2005/0030388 A1 | 2/2005 | Stavely et al. |
| 2005/0033645 A1 | 2/2005 | Duphily |
| 2005/0033685 A1 | 2/2005 | Reyes |
| 2005/0033690 A1 | 2/2005 | Antognini et al. |
| 2005/0033695 A1 | 2/2005 | Minowa |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0077351 A1 | 4/2005 | De Jong |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0089209 A1 | 4/2005 | Stefanuk |
| 2005/0091161 A1 | 4/2005 | Gustin |
| 2005/0096992 A1 | 5/2005 | Geisel |
| 2005/0097019 A1 | 5/2005 | Jacobs |
| 2005/0097046 A1* | 5/2005 | Singfield ............ G06Q 20/042 705/42 |
| 2005/0097050 A1 | 5/2005 | Orcutt |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0131820 A1 | 6/2005 | Rodriguez |
| 2005/0143136 A1 | 6/2005 | Lev et al. |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177494 A1 | 8/2005 | Kelly et al. |
| 2005/0177499 A1 | 8/2005 | Thomas |
| 2005/0177510 A1 | 8/2005 | Hilt et al. |
| 2005/0177518 A1 | 8/2005 | Brown |
| 2005/0182710 A1 | 8/2005 | Andersson |
| 2005/0188306 A1 | 8/2005 | Mackenzie |
| 2005/0203430 A1 | 9/2005 | Williams et al. |
| 2005/0205661 A1 | 9/2005 | Taylor |
| 2005/0209961 A1 | 9/2005 | Michelsen |
| 2005/0213805 A1 | 9/2005 | Blake et al. |
| 2005/0216410 A1* | 9/2005 | Davis ................... G06Q 20/042 705/45 |
| 2005/0218209 A1 | 10/2005 | Heilper et al. |
| 2005/0220324 A1 | 10/2005 | Klein et al. |
| 2005/0228733 A1 | 10/2005 | Bent |
| 2005/0244035 A1 | 11/2005 | Klein et al. |
| 2005/0252955 A1 | 11/2005 | Sugai |
| 2005/0267843 A1 | 12/2005 | Acharya et al. |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeConte |

(56) References Cited

U.S. PATENT DOCUMENTS

| | | |
|---|---|---|
| 2005/0281474 A1 | 12/2005 | Huang |
| 2005/0289030 A1 | 12/2005 | Smith |
| 2005/0289059 A1 | 12/2005 | Brewington et al. |
| 2005/0289182 A1 | 12/2005 | Pandian et al. |
| 2006/0002426 A1 | 1/2006 | Madour |
| 2006/0004660 A1 | 1/2006 | Pranger |
| 2006/0015450 A1 | 1/2006 | Guck et al. |
| 2006/0015733 A1* | 1/2006 | O'Malley et al. ..... G07D 7/004 713/176 |
| 2006/0017752 A1 | 1/2006 | Kurzweil et al. |
| 2006/0025697 A1 | 2/2006 | Kurzweil |
| 2006/0039628 A1 | 2/2006 | Li et al. |
| 2006/0039629 A1 | 2/2006 | Li et al. |
| 2006/0041506 A1 | 2/2006 | Mason et al. |
| 2006/0045321 A1 | 3/2006 | Yu |
| 2006/0045374 A1 | 3/2006 | Kim et al. |
| 2006/0045379 A1 | 3/2006 | Heaney, Jr. et al. |
| 2006/0047593 A1 | 3/2006 | Naratil |
| 2006/0049242 A1 | 3/2006 | Mejias et al. |
| 2006/0053056 A1 | 3/2006 | Alspach-Goss |
| 2006/0059085 A1 | 3/2006 | Tucker |
| 2006/0064368 A1 | 3/2006 | Forte |
| 2006/0080245 A1 | 4/2006 | Bahl |
| 2006/0085357 A1 | 4/2006 | Pizarro |
| 2006/0085516 A1 | 4/2006 | Farr et al. |
| 2006/0102704 A1 | 5/2006 | Reynders |
| 2006/0103893 A1* | 5/2006 | Azimi ................ H04N 1/00212 358/474 |
| 2006/0106691 A1 | 5/2006 | Sheaffer |
| 2006/0106717 A1 | 5/2006 | Randle |
| 2006/0108168 A1 | 5/2006 | Fischer et al. |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu et al. |
| 2006/0118613 A1 | 6/2006 | McMann |
| 2006/0124730 A1 | 6/2006 | Maloney |
| 2006/0144924 A1 | 7/2006 | Stover |
| 2006/0144937 A1 | 7/2006 | Heilper et al. |
| 2006/0144950 A1 | 7/2006 | Johnson |
| 2006/0159367 A1 | 7/2006 | Zeineh et al. |
| 2006/0161499 A1 | 7/2006 | Rich et al. |
| 2006/0161501 A1 | 7/2006 | Waserstein |
| 2006/0164682 A1 | 7/2006 | Lev |
| 2006/0166178 A1 | 7/2006 | Driedijk |
| 2006/0167818 A1 | 7/2006 | Wentker et al. |
| 2006/0181614 A1 | 8/2006 | Yen et al. |
| 2006/0182331 A1 | 8/2006 | Gilson et al. |
| 2006/0182332 A1 | 8/2006 | Weber |
| 2006/0186194 A1 | 8/2006 | Richardson et al. |
| 2006/0202014 A1 | 9/2006 | VanKirk et al. |
| 2006/0206506 A1 | 9/2006 | Fitzpatrick |
| 2006/0208059 A1 | 9/2006 | Cable et al. |
| 2006/0210138 A1 | 9/2006 | Hilton et al. |
| 2006/0212391 A1 | 9/2006 | Norman et al. |
| 2006/0212393 A1 | 9/2006 | Brown |
| 2006/0214940 A1 | 9/2006 | Kinoshita |
| 2006/0215204 A1 | 9/2006 | Miyamoto et al. |
| 2006/0215230 A1 | 9/2006 | Borrey et al. |
| 2006/0221198 A1 | 10/2006 | Fry et al. |
| 2006/0222260 A1 | 10/2006 | Sambongi et al. |
| 2006/0229976 A1 | 10/2006 | Jung |
| 2006/0229986 A1 | 10/2006 | Corder |
| 2006/0238503 A1 | 10/2006 | Smith |
| 2006/0242062 A1 | 10/2006 | Peterson |
| 2006/0242063 A1 | 10/2006 | Peterson |
| 2006/0248009 A1 | 11/2006 | Hicks et al. |
| 2006/0249567 A1 | 11/2006 | Byrne |
| 2006/0274164 A1 | 12/2006 | Kimura et al. |
| 2006/0279628 A1 | 12/2006 | Fleming |
| 2006/0282383 A1 | 12/2006 | Doran |
| 2006/0289630 A1 | 12/2006 | Updike et al. |
| 2006/0291744 A1 | 12/2006 | Ikeda et al. |
| 2007/0002157 A1 | 1/2007 | Shintani et al. |
| 2007/0013721 A1 | 1/2007 | Vau et al. |
| 2007/0016796 A1 | 1/2007 | Singhal |
| 2007/0019243 A1 | 1/2007 | Sato |
| 2007/0022053 A1 | 1/2007 | Waserstein |
| 2007/0027802 A1 | 2/2007 | VanDeburg et al. |
| 2007/0030357 A1 | 2/2007 | Levien et al. |
| 2007/0031022 A1 | 2/2007 | Frew |
| 2007/0038561 A1 | 2/2007 | Vancini et al. |
| 2007/0041629 A1 | 2/2007 | Prakash et al. |
| 2007/0050292 A1 | 3/2007 | Yarbrough |
| 2007/0053574 A1 | 3/2007 | Verma et al. |
| 2007/0058851 A1 | 3/2007 | Quine |
| 2007/0063016 A1 | 3/2007 | Myatt |
| 2007/0064991 A1 | 3/2007 | Douglas et al. |
| 2007/0065143 A1 | 3/2007 | Didow et al. |
| 2007/0075772 A1 | 4/2007 | Kokubo |
| 2007/0076940 A1 | 4/2007 | Goodall et al. |
| 2007/0076941 A1 | 4/2007 | Carreon et al. |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth |
| 2007/0086643 A1 | 4/2007 | Spier |
| 2007/0094088 A1 | 4/2007 | Mastie |
| 2007/0094140 A1 | 4/2007 | Riney et al. |
| 2007/0100748 A1 | 5/2007 | Dheer |
| 2007/0110277 A1 | 5/2007 | Hayduchok et al. |
| 2007/0118472 A1 | 5/2007 | Allen-Rouman et al. |
| 2007/0122024 A1 | 5/2007 | Haas et al. |
| 2007/0124241 A1 | 5/2007 | Newton |
| 2007/0127805 A1 | 6/2007 | Foth et al. |
| 2007/0129955 A1 | 6/2007 | Dalmia |
| 2007/0136198 A1 | 6/2007 | Foth et al. |
| 2007/0138255 A1 | 6/2007 | Carreon et al. |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0154098 A1 | 7/2007 | Geva et al. |
| 2007/0156438 A1 | 7/2007 | Popadic et al. |
| 2007/0168265 A1 | 7/2007 | Rosenberger |
| 2007/0168283 A1 | 7/2007 | Alvarez et al. |
| 2007/0171288 A1 | 7/2007 | Inoue |
| 2007/0172107 A1 | 7/2007 | Jones et al. |
| 2007/0172148 A1 | 7/2007 | Hawley |
| 2007/0179883 A1 | 8/2007 | Questembert |
| 2007/0183000 A1 | 8/2007 | Eisen et al. |
| 2007/0183741 A1 | 8/2007 | Lerman et al. |
| 2007/0194102 A1 | 8/2007 | Cohen |
| 2007/0198432 A1 | 8/2007 | Pitroda et al. |
| 2007/0203708 A1 | 8/2007 | Polycn et al. |
| 2007/0206877 A1 | 9/2007 | Wu et al. |
| 2007/0208816 A1 | 9/2007 | Baldwin et al. |
| 2007/0214086 A1 | 9/2007 | Hornoki |
| 2007/0217669 A1 | 9/2007 | Swift et al. |
| 2007/0233525 A1 | 10/2007 | Boyle |
| 2007/0233585 A1 | 10/2007 | Ben Simon et al. |
| 2007/0235518 A1 | 10/2007 | Mueller et al. |
| 2007/0235520 A1 | 10/2007 | Smith et al. |
| 2007/0241179 A1 | 10/2007 | Davis |
| 2007/0244782 A1 | 10/2007 | Chimento |
| 2007/0246525 A1 | 10/2007 | Smith et al. |
| 2007/0251992 A1 | 11/2007 | Sharma et al. |
| 2007/0255652 A1 | 11/2007 | Tumminaro |
| 2007/0255653 A1 | 11/2007 | Tumminaro |
| 2007/0255662 A1 | 11/2007 | Tumminaro |
| 2007/0258634 A1 | 11/2007 | Simonoff |
| 2007/0262148 A1 | 11/2007 | Yoon |
| 2007/0268540 A1 | 11/2007 | Gaspardo et al. |
| 2007/0271182 A1 | 11/2007 | Prakash et al. |
| 2007/0278286 A1 | 12/2007 | Crowell et al. |
| 2007/0288380 A1 | 12/2007 | Starrs |
| 2007/0288382 A1 | 12/2007 | Narayanan et al. |
| 2007/0295803 A1 | 12/2007 | Levine et al. |
| 2007/0299928 A1 | 12/2007 | Kohli et al. |
| 2008/0002911 A1 | 1/2008 | Eisen |
| 2008/0010204 A1 | 1/2008 | Rackley, III et al. |
| 2008/0021802 A1 | 1/2008 | Pendelton |
| 2008/0040280 A1 | 2/2008 | Davis et al. |

(56) References Cited

U.S. PATENT DOCUMENTS

| | | |
|---|---|---|
| 2008/0046362 A1 | 2/2008 | Easterly |
| 2008/0052182 A1 | 2/2008 | Marshall |
| 2008/0059376 A1 | 3/2008 | Davis |
| 2008/0063253 A1 | 3/2008 | Wood |
| 2008/0065524 A1 | 3/2008 | Matthews et al. |
| 2008/0068674 A1 | 3/2008 | McIntyre |
| 2008/0071679 A1 | 3/2008 | Foley |
| 2008/0071721 A1 | 3/2008 | Wang |
| 2008/0073423 A1 | 3/2008 | Heit et al. |
| 2008/0080760 A1 | 4/2008 | Ronca |
| 2008/0086420 A1 | 4/2008 | Gilder et al. |
| 2008/0086421 A1 | 4/2008 | Gilder |
| 2008/0086770 A1 | 4/2008 | Kulkarni et al. |
| 2008/0091599 A1 | 4/2008 | Foss, Jr. |
| 2008/0097899 A1 | 4/2008 | Jackson et al. |
| 2008/0097907 A1 | 4/2008 | Till et al. |
| 2008/0103790 A1 | 5/2008 | Abernethy |
| 2008/0103967 A1 | 5/2008 | Ackert et al. |
| 2008/0113674 A1 | 5/2008 | Baig |
| 2008/0114739 A1 | 5/2008 | Hayes |
| 2008/0115066 A1 | 5/2008 | Pavley et al. |
| 2008/0116257 A1 | 5/2008 | Fickling |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0140579 A1 | 6/2008 | Sanjiv |
| 2008/0147549 A1 | 6/2008 | Ruthbun |
| 2008/0155672 A1 | 6/2008 | Sharma |
| 2008/0156438 A1 | 7/2008 | Stumphauzer et al. |
| 2008/0162319 A1 | 7/2008 | Breeden et al. |
| 2008/0162350 A1 | 7/2008 | Allen-Rouman et al. |
| 2008/0162371 A1 | 7/2008 | Rampell et al. |
| 2008/0177659 A1 | 7/2008 | Lacey et al. |
| 2008/0180750 A1 | 7/2008 | Feldman |
| 2008/0205751 A1 | 8/2008 | Mischler |
| 2008/0208727 A1 | 8/2008 | McLaughlin et al. |
| 2008/0214180 A1 | 9/2008 | Cunningham et al. |
| 2008/0219543 A1 | 9/2008 | Csulits |
| 2008/0245869 A1 | 10/2008 | Berkun et al. |
| 2008/0247629 A1 | 10/2008 | Gilder |
| 2008/0247655 A1 | 10/2008 | Yano |
| 2008/0249931 A1 | 10/2008 | Gilder et al. |
| 2008/0249951 A1 | 10/2008 | Gilder et al. |
| 2008/0262950 A1 | 10/2008 | Christensen et al. |
| 2008/0262953 A1 | 10/2008 | Anderson |
| 2008/0275821 A1 | 11/2008 | Bishop et al. |
| 2008/0301441 A1 | 12/2008 | Calman et al. |
| 2008/0304769 A1 | 12/2008 | Hollander et al. |
| 2008/0316542 A1 | 12/2008 | Mindrum et al. |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0066987 A1 | 3/2009 | Inokuchi |
| 2009/0076921 A1 | 3/2009 | Nelson et al. |
| 2009/0094148 A1 | 4/2009 | Gilder et al. |
| 2009/0108080 A1 | 4/2009 | Meyer |
| 2009/0110281 A1 | 4/2009 | Hirabayashi |
| 2009/0114716 A1 | 5/2009 | Ramachandran |
| 2009/0141962 A1 | 6/2009 | Borgia et al. |
| 2009/0164350 A1 | 6/2009 | Sorbe et al. |
| 2009/0164370 A1 | 6/2009 | Sorbe et al. |
| 2009/0166406 A1 | 7/2009 | Pigg et al. |
| 2009/0167870 A1 | 7/2009 | Caleca et al. |
| 2009/0171795 A1 | 7/2009 | Clouthier et al. |
| 2009/0171819 A1 | 7/2009 | Von der Emde et al. |
| 2009/0171825 A1 | 7/2009 | Roman |
| 2009/0173781 A1 | 7/2009 | Ramachadran |
| 2009/0185241 A1 | 7/2009 | Nepomniachtchi |
| 2009/0185737 A1 | 7/2009 | Nepomniachtchi |
| 2009/0185738 A1 | 7/2009 | Nepomniachtchi |
| 2009/0190823 A1 | 7/2009 | Walters |
| 2009/0192938 A1 | 7/2009 | Amos |
| 2009/0212929 A1 | 8/2009 | Drory et al. |
| 2009/0236413 A1 | 9/2009 | Mueller et al. |
| 2009/0240620 A1 | 9/2009 | Kendrick et al. |

| | | |
|---|---|---|
| 2009/0252437 A1 | 10/2009 | Li |
| 2009/0254447 A1 | 10/2009 | Blades |
| 2009/0257641 A1 | 10/2009 | Liu et al. |
| 2009/0263019 A1 | 10/2009 | Tzadok et al. |
| 2009/0271287 A1 | 10/2009 | Halpern |
| 2009/0281904 A1 | 11/2009 | Pharris |
| 2009/0284637 A1 | 11/2009 | Parulski et al. |
| 2009/0290751 A1 | 11/2009 | Ferman et al. |
| 2009/0292628 A1 | 11/2009 | Dryer et al. |
| 2009/0313167 A1 | 12/2009 | Dujari et al. |
| 2009/0319425 A1 | 12/2009 | Tumminaro et al. |
| 2009/0327129 A1 | 12/2009 | Collas et al. |
| 2010/0007899 A1 | 1/2010 | Lay |
| 2010/0027679 A1 | 2/2010 | Sunahara et al. |
| 2010/0030687 A1 | 2/2010 | Panthaki et al. |
| 2010/0047000 A1 | 2/2010 | Park et al. |
| 2010/0057578 A1 | 3/2010 | Blair et al. |
| 2010/0061446 A1 | 3/2010 | Hands et al. |
| 2010/0078471 A1 | 4/2010 | Lin et al. |
| 2010/0082468 A1 | 4/2010 | Low et al. |
| 2010/0082470 A1* | 4/2010 | Walach ............... G06Q 20/0425 705/35 |
| 2010/0165015 A1 | 7/2010 | Barkley et al. |
| 2010/0198733 A1 | 8/2010 | Gantman et al. |
| 2010/0225773 A1 | 9/2010 | Lee |
| 2010/0226559 A1 | 9/2010 | Najari et al. |
| 2010/0260408 A1 | 10/2010 | Prakash et al. |
| 2010/0262522 A1 | 10/2010 | Anderson et al. |
| 2010/0274693 A1 | 10/2010 | Bause et al. |
| 2010/0312705 A1 | 12/2010 | Caruso et al. |
| 2011/0016084 A1 | 1/2011 | Mundy et al. |
| 2011/0069180 A1 | 3/2011 | Nijemcevic et al. |
| 2011/0106675 A1 | 5/2011 | Perlman |
| 2011/0112967 A1 | 5/2011 | Anderson et al. |
| 2011/0170740 A1 | 7/2011 | Coleman |
| 2011/0191161 A1 | 8/2011 | Dai |
| 2011/0251956 A1 | 10/2011 | Cantley et al. |
| 2011/0280450 A1 | 11/2011 | Nepomniachtchi et al. |
| 2011/0285874 A1 | 11/2011 | Showering et al. |
| 2011/0310442 A1 | 12/2011 | Popadic et al. |
| 2012/0045112 A1 | 2/2012 | Lundblad et al. |
| 2012/0047070 A1 | 2/2012 | Pharris |
| 2012/0062732 A1 | 3/2012 | Marman et al. |
| 2012/0089514 A1 | 4/2012 | Kraemling et al. |
| 2012/0099792 A1 | 4/2012 | Chevion et al. |
| 2012/0185383 A1 | 7/2012 | Atsmon |
| 2012/0185388 A1 | 7/2012 | Pranger |
| 2012/0229872 A1 | 9/2012 | Dolev |
| 2013/0021651 A9 | 1/2013 | Popadic et al. |
| 2013/0103582 A1 | 4/2013 | Singfield |
| 2013/0120595 A1 | 5/2013 | Roach et al. |
| 2013/0198071 A1 | 8/2013 | Jurss |
| 2013/0223721 A1 | 8/2013 | Nepomniachtchi et al. |
| 2013/0297353 A1 | 11/2013 | Strange |
| 2014/0032406 A1 | 1/2014 | Roach et al. |
| 2014/0067661 A1 | 3/2014 | Elischer |
| 2014/0236820 A1 | 8/2014 | Carlton et al. |
| 2014/0279453 A1 | 9/2014 | Belchee et al. |
| 2015/0039528 A1 | 2/2015 | Minogue et al. |
| 2015/0090782 A1 | 4/2015 | Dent |

FOREIGN PATENT DOCUMENTS

| | | |
|---|---|---|
| KR | 20040076131 A | 8/2004 |
| WO | WO 98/37655 A1 | 8/1998 |
| WO | WO 01/61436 A2 | 8/2001 |
| WO | WO 2006/075967 A1 | 7/2006 |
| WO | WO 2006/086768 A2 | 8/2006 |
| WO | WO 2006/136958 A2 | 12/2006 |

OTHER PUBLICATIONS

"Accept "Customer Not Present" Checks," Accept Check Online, http://checksoftware.com, Cited in U.S. Pat. No. 7,900,822, as dated 2007 (1 pg).

"Adjusting Brightness and Contrast", www.eaglesoftware.com/adjustin.htm, retrieved on May 4, 2009 (4 pgs).

(56) References Cited

OTHER PUBLICATIONS

"Best practices for producing quality digital image files," Digital Images Guidelines, http://deepblue.lib.umich.edu/bitstream/2027.42/40247/1/Images-Best_Practice.pdf, downloaded 2007 (2 pgs).
"Chapter 7 Payroll Programs," Uniform Staff Payroll System, http://www2.oecn.k12.oh.us/www/ssdt/usps/usps_user_guide_005.html, Cited in U.S. Pat. No. 7,900,822, as dated 2007 (9 pgs).
"Check 21—The check is not in the post", RedTitan Technology 2004 http://www.redtitan.com/check21/htm (3 pgs).
"Check 21 Solutions," Columbia Financial International, Inc. http://www.columbiafinancial.us/check21/solutions.htm, Cited in U.S. Pat. No. 7,900,822, as dated 2007 (8 pgs).
"Check Fraud: A Guide to Avoiding Losses", All Net, http://all.net/books/audit/checkfraud/security.htm, Cited in U.S. Pat. No. 7,900,822, as dated 2007 (1 pg).
"Compliance with Regulation CC", http./www/federalreserve.gov/Pubs/regcc/regcc.htm, Jan. 24, 2006 (6 pgs).
"Customer Personalized Bank Checks and Address Labels" Checks Your Way Inc., http://www.checksyourway.com/htm/web_pages/faq.htm, Cited in U.S. Pat. No. 7,900,822, as dated 2007 (6 pgs).
"Direct Deposit Application for Payroll", Purdue University, Business Office Form 0003, http://purdue.edu/payroll/pdf/directdepositapplication.pdf Jul. 2007 (2 pgs).
"Direct Deposit Authorization Form", www.umass.edu/humres/library/DDForm.pdf, May 2003 (3 pgs).
"Direct Deposit," University of Washington, http://www.washington.edu/admin/payroll/directdeposit.html, Cited in U.S. Pat. No. 7,900,822, as dated 2007 (3 pgs).
"Frequently Asked Questions" Bank of America, http://www/bankofamerica.com/deposits/checksave/index.cfm?template-lc_faq_bymail, Cited in U.S. Pat. No. 7,900,822, as dated 2007 (2 pgs).
"Full Service Direct Deposit", www.nonprofitstaffing.com/images/upload/dirdepform.pdf. Cited in U.S. Pat. No. 7,900,822, as dated 2001, (2 pgs).
"How to Digitally Deposit a Check Image", Smart Money Daily, Copyright 2008 (5 pgs).
"ImageNet Mobile Deposit Provides Convenient Check Deposit and Bill Pay to Mobile Consumers," Miteksystems, 2008 (2 pgs).
"It's the easiest way to Switch banks", LNB, http://www.inbky.com/pdf/LNBswitch-kit10-07.pdf Cited in U.S. Pat. No. 7,996,316, as dated 2007 (7 pgs).
"Lesson 38—More Bank Transactions", Turtle Soft, http://www.turtlesoft.com/goldenseal-software-manual.lesson38.htm, Cited in U.S. Pat. No. 7,900,822, as dated 2007 (8 pgs).
"Middleware", David E. Bakken, Encyclopedia of Distributed Computing, Kluwer Academic Press, 2001 (6 pgs).
"Mitek Systems Announces Mobile Deposit Application for Apple iPhone," http://prnewswire.com/cgi-bin/stories/pl?ACCT=104&STORY=/www/story/10-01- . . . , Nov. 25, 2008 (2 pgs).
"Personal Finance", PNC, http://www.pnc.com/webapp/unsec/productsandservice.do?sitearea=/PNC/home/personal/account+services/quick+switch/quick+switch+faqs, Cited in U.S. Pat. No. 7,900,822, as dated 2007 (12 pgs).
"Refractive index" Wikipedia, the free encyclopedia; http://en.wikipedia.org./wiki/refractiveindex.com Oct. 16, 2007 (4 pgs).
"Remote check deposit is the answer to a company's banking problem," Daily Breeze, Torrance, CA, Nov. 17, 2006, 2 pgs.
"Remote Deposit Capture", Plante & Moran, http://plantemoran.com/industries/fincial/institutions/bank/resources/community+bank+advisor/2007+summer+issue/remote+deposit+capture.htm, Cited in U.S. Pat. No. 7,900,822, as dated 2007 (3 pgs).
"Remote Deposit" National City, http://www.nationalcity.com/smallbusiness/cashmanagement/remotedeposit/default.asp; Cited in U.S. Pat. No. 7,900,822, as dated 2007 (1 pg).
"Save on ATM Fees", RedEye Edition, Chicago Tribune, Chicago, IL Jun. 30, 2007 (2 pgs).
"SNB Check Capture: SmartClient User's Guide," Nov. 2006, 21 pgs.
"Switching Made Easy," Bank of North Georgia, http://www.banknorthgeorgia.com/cmsmaster/documents/286/documents616.pdf, 2007 (7 pgs).
"Two Words Every Business Should Know: Remote Deposit," Canon, http://www.rpsolutions.com/rpweb/pdfs/canon_rdc.pdf, 2005 (7 pgs).
"Virtual Bank Checks", Morebusiness.com, http://www.morebusiness.com/running_yourbusiness/businessbits/d908484987.brc, Cited in U.S. Pat. No. 7,900,822, as dated 2007 (3 pgs).
"WallStreetGrapevine.com" Stocks on the Rise: JADG, BKYI, MITK; Mar. 3, 2008 (4 pgs).
"What is check Fraud", National Check Fraud Center, http://www.ckfraud.org/ckfraud.html , Cited in U.S. Pat. No. 7,900,822, as dated 2007 (12 pgs).
Affinity Federal Credit Union, "Affinity Announces Online Deposit," Aug. 4, 2005 (1 pg).
Albrecht, W. Steve, "Check Kiting: Detection, Prosecution and Prevention," The FBI Law Enforcement Bulletin, Nov. 1, 1993 (6 pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).
Amber Avalona-Butler / Paraglide, "At Your Service: Best iPhone Apps for Military Lifestyle," Jul. 9, 2010 (2 pgs).
Anderson, Milton M. "FSML and Echeck", Financial Services Technology Consortium, 1999 (17 pgs).
Archive Index Systems; Panini My Vision X-30 or VX30 or X30 © 1994-2008 Archive Systems, Inc. P./O. Box 40135 Bellevue, WA USA 98015 (2 pgs).
Associate of German Banks, SEPA 2008: Uniform Payment Instruments for Europe, Berlin, Cited in U.S. Pat. No. 7,900,822, as dated Jul. 2007, Bundesverbankd deutscher banker ev (42 pgs).
Automated Merchant Systems, Inc., "Electronic Check Conversion," http://www.automatedmerchant.com/electronic_check_conversion.cfm, 2006, downloaded Oct. 18, 2006 (3 pgs).
Bank Systems & Technology, Untitled Article, May 1, 2006, http://www.banktech.com/showarticle.jhtml? articleID=187003126, "Are you Winning in the Payment World?" (4 pgs).
BankServ, "DepositNow: What's the difference?" Cited in U.S. Pat. No. 7,970,677, as dated 2006, (4 pgs).
BankServ, Product Overview, http://www.bankserv.com/products/remotedeposit.htm, Cited in U.S. Pat. No. 7,970,677, as dated 2006, (3 pgs).
Blafore, Bonnie "Lower Commissions, Fewer Amenities", Better Investing, Madison Heights: Feb. 2003, vol. 52, Iss 6, (4 pgs).
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).
Blue Mountain Consulting, from URL: www.bluemontainconsulting.com, Cited in U.S. Pat. No. 7,900,822, as dated Apr. 26, 2006 (3 pgs).
Board of Governors of the federal reserve system, "Report to the Congress on the Check Clearing for the 21st Century Act of 2003" Apr. 2007, Submitted to Congress pursuant to section 16 of the Check Clearing for the 21st Century Act of 2003, (59 pgs).
Bruene, Jim; "Digital Federal Credit Union and Four Others Offer Consumer Remote Deposit Capture Through EasCorp", NetBanker—Tracking Online Finance, www.netbanker.com/2008/04/digital_federal_credit_union_a.html, Apr. 13, 2008 (3 pgs).
Bruno, M., "Instant Messaging," Bank Technology News, Dec. 2002 (3 pgs).
Burnett, J. "Depository Bank Endorsement Requirements," BankersOnline.com, http://www.bankersonline.com/cgi-bin/printview/printview.pl, Jan. 6, 2003 (3 pgs).
Canon, ImageFormula CR-25/CR-55, "Improve Your Bottom Line with Front-Line Efficiencies", 0117W117, 1207-55/25-1 OM-BSP, Cited in U.S. Pat. No. 7,949,587 as dated 2007. (4 pgs).
Carrubba, P. et al., "Remote Deposit Capture: A White Paper Addressing Regulatory, Operational and Risk Issues," NetDeposit Inc., 2006 (11 pgs).

(56) References Cited

OTHER PUBLICATIONS

Century Remote Deposit High-Speed Scanner User's Manual Release 2006, (Century Manual), Century Bank, 2006, (32 pgs).
Chiang, Chuck, The Bulletin, "Remote banking offered", http://bendbulletin.com/apps/pbcs.dll/article?AID=/20060201/BIZ0102/602010327&templ . . . , May 23, 2008 (2 pgs).
CNN.com/technology, "Scan, deposit checks from home", www.cnn.com/2008ITECH/biztech/02/07/check.scanning.ap/index.html, Feb. 7, 2008 (3 pgs).
Constanzo, Chris, "Remote Check Deposit: Wells Captures a New Checking Twist", Bank Technology News Article—May 2005, www.americanbanker.com/btn_article.html?id=20050502YQ50FSYG (2 pgs).
Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).
Credit Union Journal, "The Ramifications of Remote Deposit Capture Success", www.cuiournal.com/orintthis.html?id=20080411EODZT57G, Apr. 14, 2008 (1 pg).
Credit Union Journal, "AFCU Averaging 80 DepositHome Transactions Per Day", Credit Union Journal, Aug. 15, 2005 (1 pg).
DCU Member's Monthly—Jan. 2008, "PC Deposit—Deposit Checks from Home!", http://www.mycreditunionnewsletter.com/dcu/0108/page1.html, Copyright 2008 Digital Federal Credit Union (2 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
De Queiroz, Ricardo et al., "Mixed Raster Content (MRC) Model for Compound Image Compression", 1998 (14 pgs).
Debello, James et al., "RDM and Mitek Systems to Provide Mobile Check Deposit", Mitek Systems, Inc., San Diego, California and Waterloo, Ontario, (Feb. 24, 2009), 2 pgs.
DeYoung, Robert; "The Financial Performance of Pure Play Internet Banks"; Federal Reserve Bank of Chicago Economic Perspectives; 2001; pp. 60-75; vol. 25, No. 1 (16pgs).
Dias, Danilo et al., "A Model for the Electronic Representation of Bank Checks", Brasilia Univ. Oct. 2006 (5 pgs).
Digital Transactions News, "An ACH-Image Proposal for Check Roils Banks and Networks" May 26, 2006 (3 pgs).
Dinan, R.F. et al., "Image Plus High Performance Transaction System", IBM Systems Journal, 1990 vol. 29, No. 3 (14 pgs).
Doermann, David et al., "Progress in Camera-Based Document Image Analysis," Proceedings of the Seventh International Conference on Document Analysis and Recognition (ICDAR 2003) 0-7695-1960-1/03, 2003 IEEE (11 pages).
Duvall, Mel, "Remote Deposit Capture," Baseline, vol. 1, Issue 70, Mar. 2007, 2 pgs.
ECU Technologies, "Upost Remote Deposit Solution," Retrieved from the internet https://www.eutechnologies.com/products/upost.html, downloaded 2009 (1 pg).
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).
Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, Cited in U.S. Pat. No. 7,873,200, as dated Dec. 2005 (20 pgs).
Federal Reserve Board, "Check Clearing for the 21st Century Act", FRB, http://www.federalreserve.gov/paymentsystems/truncation/, Mar. 1, 2006 (1 pg).
Federal Reserve System, "12 CFR, Part 229 [Regulation CC]: Availability of Funds and Collection of Checks," Federal Registrar, Apr. 28, 1997, pp. 1-50.
Federal Reserve System, "Part IV, 12 CFR Part 229 [Regulation CC]: Availability of Funds and Collection of Checks; Final Rule," Federal Registrar, vol. 69, No. 149, Aug. 4, 2004, pp. 47290-47328.
Fest, Glen., "Patently Unaware" Bank Technology News, Apr. 2006, Retrieved from the internet at URL:http://banktechnews.com/article.html?id=2006403T7612618 (5 pgs).
Fidelity Information Services, "Strategic Vision Embraces Major Changes in Financial Services Solutions: Fidelity's long-term product strategy ushers in new era of application design and processing," Insight, 2004, pp. 1-14.
Fisher, Dan M., "Home Banking in the 21st Century: Remote Capture Has Gone Retail", May 2008 (4 pgs).
Furst, Karen et al., "Internet Banking: Developments and Prospects", Economic and Policy Analysis Working Paper Sep. 2000, Sep. 2000 (60 pgs).
Garry, M., "Checking Options: Retailers face an evolving landscape for electronic check processing that will require them to choose among several scenarios," Supermarket News, vol. 53, No. 49, 2005 (3 pgs).
German Shegalov, Diplom-Informatiker, "Integrated Data, Message, and Process Recovery for Failure Masking in Web Services", Dissertation Jul. 2005 (146 pgs).
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).
Gupta, Maya R. et al., "OCR binarization and image pre-processing for searching historical documents," Pattern Recognition, vol. 40, No. 2, Feb. 2007, pp. 389-397.
Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).
Hartly, Thomas, "Banks Check Out New Image", Business First, Buffalo: Jul. 19, 2004, vol. 20, Issue 43, (3 pgs).
Heckenberg, D. "Using Mac OS X for Real-Time Image Processing" Oct. 8, 2003 (15 pgs).
Herley, Cormac, "Efficient Inscribing of Noisy Rectangular Objects in Scanned Images," 2004 International Conference on Image Processing, 4 pages.
Hildebrand, C. et al., "Electronic Money," Oracle, http://www.oracle.com/oramag/profit/05-feb/p15financial.html, 2005, downloaded Oct. 18, 2006 (5 pgs).
Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).
Image Master, "Photo Restoration: We specialize in digital photo restoration and photograph repair of family pictures", http://www.imphotorepair.com, Cited in U.S. Pat. No. 7,900,822, as downloaded Apr. 2007 (1 pg).
Investment Systems Company, "Portfolio Accounting System," 2000, pp. 1-32.
JBC, "What is a MICR Line'?," eHow.com, retrieved from http://www.ehow.com/about_4684793_what-micr-line.html on May 4, 2009 (2 pgs).
Johnson, Jennifer J., Secretary of the Board; Federal Reserve System, 12 CFR Part 229, Regulation CC, "Availability of Funds and Collection of Checks". Cited in U.S. Pat. No. 7,900,822, as dated 2009, (89 pgs).
Kendrick, Kevin B., "Check Kiting, Float for Purposes of Profit," Bank Security & Fraud Prevention, vol. 1, No. 2, 1994 (3 pgs).
Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).
Knestout, Brian P. et al., "Banking Made Easy" Kiplinger's Personal Finance Washington, Jul. 2003, vol. 57, Iss 7 (5 pgs).
Kornai Andras et al., "Recognition of Cursive Writing on Personal Checks", Proceedings of International Workshop on the Frontiers in Handwriting Recognition, Cited in U.S. Pat. No. 7,900,822, as dated Sep. 1996, (6 pgs).

(56) References Cited

OTHER PUBLICATIONS

Levitin, Adam J., Remote Deposit Capture: A Legal and Transactional Overview, Banking Law Journal, p. 115, 2009 (RDC).
Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).
Matthews, Deborah, "Advanced Technology Makes Remote Deposit Capture Less Risky," Indiana Bankers Association, Apr. 2008 (2 pgs).
Metro 1 Credit Union, "Remote Banking Services," hltp://ww\\i.metro1cu.org/metro1cu/remote.html, downloaded Apr. 17, 2007 (4 pgs).
Mitek systems, "Imagenet Mobile Deposit", San Diego, CA, downloaded 2009 (2 pgs).
Mitek Systems: Mitek Systems Launches First Mobile Check Deposit and Bill Pay Application, San Diego, CA, Jan. 22, 2008 (3 pgs).
Mohl, Bruce, "Banks Reimbursing ATM Fee to Compete With Larger Rivals", Boston Globe, Boston, MA, Sep. 19, 2004 (3 pgs).
Moreau, T., "Payment by Authenticated Facsimile Transmission: a Check Replacement Technology for Small and Medium Enterprises," CONNOTECH Experts-conseils, Inc., Apr. 1995 (31 pgs).
Nelson, B. et al., "Remote deposit capture changes the retail landscape," Northwestern Financial Review, http://findarticles.com/p/articles/mi qa3799/is 200607/ai_n16537250, 2006 (3 pgs).
NetBank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fiserv Research Finds Banks are Interested in Offering Mobile Deposit Capture as an," Fiserv, Inc. Brookfield, Wis., (Business Wire), (Feb. 20, 2009), 2 pgs.
Online Deposit: Frequently Asked Questions, http://www.depositnow.com/faq.html, Copyright 2008 (1 pg).
Onlinecheck.com/Merchant Advisors, "Real-Time Check Debit", Merchant Advisors: Retail Check Processing Check Conversion, http://www.onlinecheck/wach/rcareal.htm, Cited in U.S. Pat. No. 7,900,822, as dated 2006 (3 pgs).
Oxley, Michael G., from committee on Financial Services; "Check Clearing for the 21$^{st}$ Century Act", 108$^{th}$ Congress, 1$^{st}$ Session House of Representatives report 108-132, Jun. 2003 (20 pgs).
Oxley, Michael G., from the committee of conference; "Check Clearing for the 21$^{st}$ st Century Act" 108$^{th}$ Congress, 1$^{st}$ Session Senate report 108-291, Oct. 1, 2003 (27 pgs).
Palacios, Rafael et al., "Automatic Processing of Brazilian Bank Checks". Cited in U.S. Pat. No. 7,900,822, as dated 2002 (28 pgs).
Patterson, Scott "USAA Deposit@Home—Another WOW moment for Net Banking", NextCU.com, Jan. 26, 2007 (5 pgs).
Public Law 108-100, 108 Congress; "An Act Check Clearing for the 21$^{st}$ Century Act", Oct. 28, 2003, 117 STAT. 1177 (18 pgs).
Rao, Bharat; "The Internet and the Revolution in Distribution: A Cross-Industry Examination"; Technology in Society; 1999; pp. 287-306; vol. 21, No. 3 (20 pgs).
Remotedepositcapture, URL:www.remotedepositcapture.com, Cited in U.S. Pat. No. 7,900,822, as dated 2006 (5 pgs).
RemoteDepositCapture.com, "PNC Bank to Offer Ease of Online Deposit Service Integrated with QuickBooks to Small Businesses", Remote Deposit Capture News Articles from Jul. 24, 2006, (2 pgs).
RemoteDepositCapture.com, Remote Deposit Capture News Articles from Jul. 6, 2006, "BankSery Announces New Remote Deposit Product Integrated with QuickBooks" (3 pgs).
Remotedepsitcapture.com, LLC, "Remote Deposit Capture Overview," ROC Overview, http://remotedepositcapture.com/overview/RDC_overview.htm, Cited in U.S. Pat. No. 7,900,822, as dated Mar. 12, 2007 (4 pgs).
Richey, J. C. et al., "EE 4530 Check Imaging," Nov. 18, 2008 (10 pgs).
Ritzer, J.R. "Hinky Dinky helped spearhead POS, remote banking movement", Bank Systems and Equipment, vol. 21, No. 12, Dec. 1984 (1 pg).
Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).
Rose, Sarah et al., "Best of the We: The Top 50 Financial Websites", Money, New York, Dec. 1999, vol. 28, Iss. 12 (8 pgs).
Shelby, Hon. Richard C. (Committee on Banking, Housing and Urban Affairs); "Check Truncation Act of 2003", calendar No. 168, 108$^{th}$ Congress, 1$^{st}$ Session Senate report 108-79, Jun. 2003 (27 pgs).
SoyBank Anywhere, "Consumer Internet Banking Service Agreement," Dec. 6, 2004 (6 pgs).
Teixeira, D., "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html, © 1999-2007 (2 pgs).
The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, Cited in U.S. Pat. No. 7,900,822, as dated Dec. 2005 (3 pgs).
The Green Sheet 2.0: Newswire, "CO-OP adds home deposit capabilities to suite of check imaging products", www.greensheet.com/newswire.php?newswire_id=8799, Mar. 5, 2008 (2 pgs).
Tygar, J.D., Atomicity in Electronic Commerce, In ACM Networker, 2:2, Apr./May 1998 (12 pgs).
Valentine, Lisa, "Remote Deposit Capture Hot Just Got Hotter," ABA Banking Journal, Mar. 2006, p. 1-9.
Wade, Will, "Early Notes: Updating Consumers on Check 21" American Banker Aug. 10, 2004 (3 pgs).
Wallison, Peter J., "Wal-Mart Case Exposes Flaws in Banking-Commerce Split", American Banker, vol. 167. No. 8, Jan. 11, 2002 (3 pgs).
Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005_check21Year=2005 (1 pg).
Wells Fargo Commercial, "Remote Deposit", www.wellsfargo.com/com/treasurymgmtlreceivables/electronic/remote_deposit, Copyright 2008 (1 pg).
White, J.M. et al., "Image Thresholding for Optical Character Recognition and Other Applications Requiring Character Image Extraction", IBM J. Res. Development, Jul. 1983, vol. 27, No. 4 (12 pgs).
Whitney et al., "Reserve Banks to Adopt DSTU X9.37-2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).
Wikipedia®, "Remote Deposit," http://en.wikipedia.org/wiki/Remote_deposit, 2007 (3 pgs).
Windowsfordevices.com, "Software lets camera phone users deposit checks, pay bills", www.windowsfordevices.com/news/NS3934956670.html, Jan. 29, 2008 (3 pgs).
Wolfe, Daniel, "Check Image Group Outlines Agenda," American Banker, New York, N.Y.: Feb. 13, 2009, vol. 174, Iss. 30, p. 12. (2 pgs).
Woody Baird Associated Press, "Pastor's Wife got Scammed—She Apparently Fell for Overseas Money Scheme," The Commercial Appeal, Jul. 1, 2006, p. A. 1.
Zhang, C.Y., "Robust Estimation and Image Combining" Astronomical Data Analysis Software and Systems IV, ASP Conference Series, 1995 (5 pgs).
Zions Bancorporation, "Moneytech, the technology of money in our world: Remote Deposit," http://www.bankjunior.com/pground/moneytech/remote_deposit.jsp, 2007 (2 pgs).
Application as filed on Feb. 15, 2012 for U.S. Appl. No. 13/397,437 (29 pgs).
Application as filed on Apr. 3, 2008 for U.S. Appl. No. 12/062,143 (27 pgs).

(56) References Cited

OTHER PUBLICATIONS

Application as filed on Aug. 19, 2010 for U.S. Appl. No. 12/859,741 (235 pgs).
Application as filed on Aug. 21, 2008 for U.S. Appl. No. 12/195,723 (38 pgs).
Application as filed on Aug. 21, 2009 for U.S. Appl. No. 12/545,127 (45 pgs).
Application as filed on Aug. 28, 2009 for U.S. Appl. No. 12/549,443 (41 pgs).
Application as filed on Dec. 20, 2006 for U.S. Appl. No. 11/613,656 (21 pgs).
Application as filed on Dec. 30, 2010 for U.S. Appl. No. 12/982,494 (280 pgs).
Application as filed on Dec. 30, 2010 for U.S. Appl. No. 12/982,561 (275 pgs).
Application as filed on Dec. 30, 2010 for U.S. Appl. No. 12/982,578 (274 pgs).
Application as filed on Dec. 30, 2010 for U.S. Appl. No. 12/982,594 (275 pgs).
Application as filed on Feb. 15, 2012 for U.S. Appl. No. 13/397,405 (19 pgs).
Application as filed on Feb. 18, 2009 for U.S. Appl. No. 12/388,005 (37 pgs).
Application as filed on Jul. 13, 2006 for U.S. Appl. No. 11/487,537 (23 pgs).
Application as filed on Jul. 27, 2009 for U.S. Appl. No. 12/509,613 (48 pgs).
Application as filed on Jul. 27, 2009 for U.S. Appl. No. 12/509,680 (41 pgs).
Application as filed on Jun. 11, 2008 for U.S. Appl. No. 12/137,051 (29 pgs).
Application as filed on Jun. 8, 2011 for U.S. Appl. No. 13/155,976 (352 pgs).
Application as filed on Jun. 8, 2011 for U.S. Appl. No. 13/156,007 (356 pgs).
Application as filed on Jun. 8, 2011 for U.S. Appl. No. 13/156,018 (353 pgs).
Application as filed on Mar. 15, 2007 for U.S. Appl. No. 11/686,924 (34 pgs).
Application as filed on Mar. 15, 2007 for U.S. Appl. No. 11/686,928 (36 pgs).
Application as filed on Mar. 4, 2009 for U.S. Appl. No. 12/397,671 (40 pgs).
Application as filed on Mar. 4, 2009 for U.S. Appl. No. 12/397,930 (37 pgs).
Application as filed on May 10, 2007 for U.S. Appl. No. 11/747,222 (35 pgs).
Application as filed on Oct. 17, 2008 for U.S. Appl. No. 12/253,278 (42 pgs).
Application as filed on Oct. 23, 2007 for U.S. Appl. No. 11/876,925 (36 pgs).
Application as filed on Oct. 23, 2007 for U.S. Appl. No. 11/877,335 (29 pgs).
Application as filed on Oct. 25, 2007 for U.S. Appl. No. 11/923,839 (22 pgs).
Application as filed on Oct. 29, 2007 for U.S. Appl. No. 11/926,388 (23 pgs).
Application as filed on Oct. 30, 2007 for U.S. Appl. No. 11/928,297 (26 pgs).
Application as filed on Oct. 31, 2006 for U.S. Appl. No. 11/590,974 (31 pgs).
Application as filed on Oct. 31, 2006 for U.S. Appl. No. 11/591,008 (27 pgs).
Application as filed on Oct. 31, 2006 for U.S. Appl. No. 11/591,227 (58 pgs).
Application as filed on Oct. 31, 2006 for U.S. Appl. No. 11/591,273 (56 pgs).
Application as filed on Oct. 31, 2007 for U.S. Appl. No. 11/930,537 (27 pgs).
Application as filed on Oct. 31, 2007 for U.S. Appl. No. 11/931,670 (47 pgs).
Application as filed on Oct. 8, 2007 for U.S. Appl. No. 11/868,884 (30 pgs).
Application as filed on Sep. 28, 2007 for U.S. Appl. No. 11/864,569 (35 pgs).
Application as filed on Sep. 8, 2008 for U.S. Appl. No. 12/205,996 (30 pgs).
Application as filed Sep. 14, 2012 for U.S. Appl. No. 13/619,405 (30 pgs).
Claims as filed on Apr. 3, 2008 for U.S. Appl. No. 12/062,163 (3 pgs).
Claims as filed on Apr. 3, 2008 for U.S. Appl. No. 12/062,175 (3 pgs).
Claims as filed on Aug. 19, 2010 for U.S. Appl. No. 12/859,752 (5 pgs).
Claims as filed on Dec. 15, 2011 for U.S. Appl. No. 13/327,478 (4 pgs).
Claims as filed on Dec. 20, 2006 for U.S. Appl. No. 11/613,671 (3 pgs).
Claims as filed on Dec. 29, 2005 for U.S. Appl. No. 11/320,998 (3 pgs).
Claims as filed on Dec. 29, 2005 for U.S. Appl. No. 11/321,027 (3 pgs).
Claims as filed on Feb. 15, 2012 for U.S. Appl. No. 13/397,437 (6 pgs).
Claims as filed on Feb. 16, 2011 for U.S. Appl. No. 13/028,477 (3 pgs).
Claims as filed on Jan. 20, 2011 for U.S. Appl. No. 13/010,644 (9 pgs).
Claims as filed on Jan. 31, 2011 for U.S. Appl. No. 13/017,865 (11 pgs).
Claims as filed on Mar. 15, 2007 for U.S. Appl. No. 11/686,925 (5 pgs).
Claims as filed on May 10, 2007 for U.S. Appl. No. 11/747,223 (4 pgs).
Claims as filed on May 18, 2011 for U.S. Appl. No. 13/110,077 (9 pgs).
Claims as filed on May 2, 2011 for U.S. Appl. No. 13/098,566 (10 pgs).
Claims as filed on Oct. 23, 2007 for U.S. Appl. No. 11/877,382 (6 pgs).
Claims as filed on Oct. 24, 2008 for U.S. Appl. No. 12/257,471 (4 pgs).
Claims as filed on Oct. 31, 2006 for U.S. Appl. No. 11/590,963 (3 pgs).
Claims as filed on Oct. 31, 2006 for U.S. Appl. No. 11/590,995 (3 pgs).
Claims as filed on Oct. 31, 2006 for U.S. Appl. No. 11/590,998 (4 pgs).
Claims as filed on Oct. 31, 2007 for U.S. Appl. No. 11/931,804 (4 pgs).
Claims as filed on Oct. 8, 2007 for U.S. Appl. No. 11/868,878 (4 pgs).
Claims as filed on Sep. 14, 2012 for U.S. Appl. No. 13/619,026 (3 pgs).
Claims as filed on Sep. 2, 2008 for U.S. Appl. No. 12/202,781 (4 pgs).
Claims as filed on Sep. 8, 2008 for U.S. Appl. No. 12/206,001 (3 pgs).
Claims as filed on Sep. 8, 2008 for U.S. Appl. No. 12/206,007 (3 pgs).
Claims as filed on Jun. 9, 2014 for U.S. Appl. No. 14/299,456 (36 pgs).
Claims as filed on Mar. 25, 2014 for U.S. Appl. No. 14/225,090 (1 pg).
Leaning, Jeffrey Scott (Reg. No. 51,184); "Remarks and Conclusion" in Response to Office Action dated Nov. 27, 2007; Response submitted to the USPTO on Feb. 20, 2008; U.S. Appl. No. 09/506,434, filed Feb. 18, 2000; (6 pages).
Notice of Allowance from corresponding U.S. Appl. No. 12/963,513 dated Nov. 2, 2012 (38 pgs).

(56) References Cited

OTHER PUBLICATIONS

Office Action dated Jun. 13, 2012 from corresponding U.S. Appl. No. 12/963,513, 15 pages.
Office Action from corresponding U.S. Appl. No. 12/951,143 dated Oct. 19, 2011 (14 pages).
Final Office Action from corresponding U.S. Appl. No. 11/591,014 dated Dec. 10, 2008 (11 pages).
Office Action from corresponding U.S. Appl. No. 11/591,014 dated Aug. 8, 2008 (10 pages).
Office Action from corresponding U.S. Appl. No. 11/590,971 dated Jan. 21, 2009 (11 pages).
Final Office Action from corresponding U.S. Appl. No. 11/590,971 dated Apr. 16, 2008 (12 pages).
Office Action from corresponding U.S. Appl. No. 11/590,971 dated Oct. 31, 2007 (9 pages).
Notice of Allowance from corresponding U.S. Appl. No. 11/591,247 dated Sep. 8, 2010 (10 pages).
Final Office Action from corresponding U.S. Appl. No. 11/591,247 dated May 5, 2010 (16 pages).
Office Action from corresponding U.S. Appl. No. 11/591,247 dated Nov. 23, 2009 (13 pages).
Final Office Action from corresponding U.S. Appl. No. 11/590,963 dated Nov. 1, 2011 (19 pages).
Office Action from corresponding U.S. Appl. No. 11/590,963 dated May 13, 2011 (18 pages).
Office Action from corresponding U.S. Appl. No. 11/590,963 dated Sep. 7, 2010 (15 pages).
Final Office Action from corresponding U.S. Appl. No. 11/590,963 dated May 5, 2010 (19 pages).
Office Action from corresponding U.S. Appl. No. 11/590,963 dated Nov. 24, 2009 (14 pages).
Notice of Allowance dated Aug. 9, 2012 from corresponding U.S. Appl. No. 11/590,963 (11 pgs).
Notice of Allowance from corresponding U.S. Appl. No. 11/591,025 dated Aug. 20, 2010 (9 pages).
Notice of Allowance from corresponding U.S. Appl. No. 11/591,025 dated Apr. 20, 2010 (10 pages).
Office Action from corresponding U.S. Appl. No. 11/591,025 dated Dec. 1, 2009 (15 pages).
Notice of Allowance dated Dec. 20, 2013 from corresponding U.S. Appl. No. 13/765,412 (15 pgs).
Office Action dated Sep. 4, 2013 from corresponding U.S. Appl. No. 13/765,412 (14 pgs).
Defendant Wells Fargo Bank, N.A.'s Answer, Affirmative Defenses, and Counterclaims to Plaintiff's Complaint, dated Aug. 14, 2018, 64 pgs.
Leica Digilux 2 Instructions located on the Internet: http://www.overgaard.dk/pdf/d2_manual.pdf (attached as Exhibit 2 from the Defendant Wells Fargo Bank N.A.'s Answer dated Aug. 14, 2018), 95 pgs.
Sony Digital Camera User's Guide/ Trouble Shooting Operating Instructions, copyright 2005, located on the Internet at: https://www.sony.co.uk/electronics/support/res/manuals/2654/26544941M.pdf (attached as Exhibit 3 from the Defendant Wells Fargo Bank N. A.'s Answer dated Aug. 14, 2018), 136 pgs.
Panasonic Operating Instructions for Digital Camera/Lens Kit Model No. DMC-L1K, https://www.panasonic.com/content/dam/Panasonic/support_manual/Digital_Still_Camera/English_01-vqt0-vqt2/vqt0w95_L1_oi.pdf (attached as Exhibit 4 from the Defendant Wells Fargo Back N.A.'s Answer dated Aug. 14, 2018), 129 pgs.
Nikon Digital Camera D300 User's Manual, located on the Internet at: http://download.nikonimglib.com/archive2/BuJv00Aj97i01y8BrK49XXOTs69/D300_Eu(En)04.pdf (attached as Exhibit 5 from the Defendant Wells Fargo Bank N.A.'s Answer dated Aug. 14, 2018), 195 pgs.
Canon EOS 40D Digital Camera Instruction Manual, located on the Internet at: http://gd1p01.c-wss.com/gds/6/0900008236/01/EOS40D_HG_EN.pdf (attached as Exhibit 6 from the Defendant Wells Fargo Bank, N.A.'s Answer dated Aug. 14, 2018), 38 pgs.
Motorola RAZR MAXX V6 User Manual, located on the Internet at: https://www.phonearena.com/phones/Motorola-RAZR-MAXX-V6_id1680, (attached as Exhibit 7 from the Defendant Wells Fargo Bank, N.A.'s Answer dated Aug. 14, 2018), 36 pgs.
Motomanual for MOTORAZR, located on the Internet at: https://www.cellphones.ca/downloads/phones/manuals/motorola-razr-v3xx-manual.pdf (excerpts attached as Exhibit 8 from the Defendant Wells Fargo Bank, N.A.'s Answer dated Aug. 14, 2018), 34 pgs.
Nokia N95 8GB User Guide, copyright 2009, located on the Internet at: https://www.nokia.com/en_int/phones/sites/default/files/user-guides/Nokia_N95_8GB_Extended_UG_en.pdf (excerpts attached as Exhibit 9 from the Defendant Wells Fargo Bank, N.A.'s Answer dated Aug. 14, 2018), 77 pgs.
Helio Ocean User Manual, located on the Internet at: https://standupwireless.com/wp-content/uploads/2017/04/Manual_PANTECH_OCEAN.pdf (excerpts attached as Exhibit 10 from the Defendant Wells Fargo Bank, N.A.'s Answer dated Aug. 14, 2018), 76 pgs.
HTC Touch Diamond Manual, copyright 2008, (attached as Exhibit 11 from the Defendant Wells Fargo Bank, N.A.'s Answer dated Aug. 14, 2018), 257 pgs.
*Automated Clearing Houses* (ACHs), Federal Reserve Bank of New York (May 2000) available at: https://www.newyorkfed.org/aboutthefed/fedpoint/fed31.html, (attached as Exhibit 12 from the Defendant Wells Fargo Bank, N.A.'s Answer dated Aug. 14, 2018), 4 pgs.
*POP, ARC and BOC—A Comparison*, Federal Reserve Banks, at 1(Jan. 7, 2009), available on the Internet at: https://web.archive.org/web/20090107101808/https://www.frbservices.org/files/eventseducation/pdf/pop_arc_boc_comparison.pdf (attached as Exhibit 13 from the Defendant Wells Fargo Bank, N.A.'s Answer dated Aug. 14, 2018), 3 pgs.
David B. Humphrey & Robert Hunt, *Getting Rid of Paper: Savings From Check 21*, Working Paper No. 12-12, Research Department, Federal Reserve Bank of Philadelphia, (May 2012), available on the Internet at: https://philadelphiafed.org/-/media/research-and-data/publications/working-papers/2012/wp12-12.pdf, (attached as Exhibit 14 from the Defendant Wells Fargo Bank, N.A.'s Answer dated Aug. 14, 2018), 29 pgs.
Jeffrey M. Lacker, *Payment System Disruptions and the Federal Reserve Following Sep. 11, 2001*, The Federal Reserve Bank of Richmond, (Dec. 23, 2003) (attached as Exhibit 19 from the Defendant Wells Fargo Bank, N.A.'s Answer dated Aug. 14, 2018), 55 pgs.
Check Clearing for the 21st Century Act Foundation for Check 21 Compliance Training, Federal Financial Institutions Examination Council, (Oct. 16, 2004), available on the Internet at: https://web.archive.org/web/20041016100648/https://www.ffiec.gov/exam/check21/check21foundationdoc.htm, (excerpts attached as Exhibit 20 from the Defendant Wells Fargo Bank, N.A.'s Answer dated Aug. 14, 2018),11 pgs.
*Big Red Book*, Adobe Systems Incorporated, copyright 2000, (attached as Exhibit 27 from the Defendant Wells Fargo Bank, N.A.'s Answer dated Aug. 14, 2018), 45 pgs.
12 CRF § 229.51 and Appendix D to Part 229 (Jan. 1, 2005 edition), 4 pgs.
149 Cong. Rec. H9289, Oct. 8, 2003, 6 pgs.
*Apple Announces the New iPhone 3GS—The Fastest, Most Powerful iPhone Yet*, Jun. 8, 2009, located on the Internet at: http://www.apple.com.rensroom/2009/06/08Apple-Annpounces-the-New-iPhone-3GS-The Fastest-Most-Powerful-iPhone-Yet, 4 pgs.
Apple Reinvents the Phone with iPhone, Jan. 2007, located on the Internet at: https://www.apple.com/newsroom/2007/01/09Apple-Reinvents-the-Phone-with-iPhone/, 4 pgs.
Askey, *Canon EOS 40D Review* (pts.1,4,10), Digital Photography Review, located on the Internet at: : https://www.dpreview.com/reviews/canoneos40d, 24 pgs.
Askey, *Leica Digilux 2 Review* (pts.1,3,7), Digital Photography Review, May 20, 2004, located on the Internet at: : https://www.dpreview.com/reviews/leicadigilux2, 20 pgs.
Askey, Nikon D300 In-depth Review (pts.1,3,9), Digital Photography Review, Mar. 12, 2008, located on the Internet at: : https://www.preview.com/reviews/nikond300, 224 pgs.

(56) References Cited

OTHER PUBLICATIONS

Askey, *Panasonic Lumix DMC-L1 Review* (pts.1,3,7), Digital Photography Review, Apr. 11, 2007, located on the Internet at: https://www.dpreview.com/reviews/panasonicdmc11, 24 pgs.
Askey, *Sony Cyber-shot DSC-R1 Review* (pts,1,3,7), Digital Photography Review, Dec. 6, 2005, located on the Internet at: http://www.dpreview.com.reviews/sonydscr1 , 24 pgs.
Berman, *How Hitchcock Turned a Small Budget Into a Great Triumph*, Time.com, Apr. 29, 2015, located on the Internet at: http://time.com/3823112/alfred-hitchcock-shadow-of-a-doubt, 1 pg.
Chen, Brian et al., *iPhone 3GS Trounces Predecessors, Rivals in Web Browser Speed Test*, Wired, Jun. 24, 2009, located on the Internet at: www.wired.com/2009.3gs-speed/, 10 pgs.
Declaration of Peter Alexander, Ph.D., CBM2019-0004, Nov. 8, 2018, 180 pgs.
"Deposit Now: Quick Start User Guide," BankServ, 2007, 29 pages.
"Electronic Billing Problem: The E-check is in the mail" American Banker—vol. 168, No. 95, May 19, 2003, 4 pgs.
Excerpts from American National Standard for Financial Services, ANS, X9.100-140-2004-Specifications for an Image Replacement Document—IRD, Oct. 1, 2004, 16 pgs.
"First Wireless Handheld Check and Credit Card Processing Solution Launched by Commericant®, MobileScape® 5000 Eliminates Bounced Checks, Enables Payments Everywhere," Business Wire, Mar. 13, 2016, 3 pgs.
Gates, *A History of Wireless Standards, Wi-Fi Back to Basics*, Areohive Blog, Jul. 2015, located on the Internet at: http://blog.aerohine.com/a-history-of-wireless-standards, 5 pgs.
*Guides for Evaluation of Radio Transmission Technologies for IMT-2000*, dated 1997, ITU-R-M.1225, located on the Internet at: https://www.itu.int/dmspubrec/itu-r/rec/m/R-REC-M,1225-0-199702-I!!PDF-E.pdf, 60 pgs.
*iPhone Store Downloads Top 10 Million in First Weekend*, Jul. 14, 2008, located on the Internet at: iPhone Store Downloads Top 10 Million in First Weekend, Jul. 14, 2008, located on the Internet at: https://www.apple.com/newsroom/2008/07/14iPhone-App-Store-Downloads-Top-10-Million-in-First-Weekend/, 4 pgs.
Joinson et al., *Olympus E-30 Review* (pts.1,4,8), Digital Photography Review, Mar. 24, 2009, located on the Internet at: www.dpreview.com/reviews/olympus30, 26 pgs.
Knerr et al., *The A2iA Intercheque System: Courtesy Amount and Legal Amount Recognition for French Checks in Automated Bankcheck Processing* 43-86, Impedove et al. eds., 1997, 50 pgs.
"Machine Accepts Bank Deposits", *New York Times*, Apr. 12, 1961, 1 pg.
MacKenzie, E., *Photography Made Easy*, copyright 1845, 80 pgs.
"NOVA Enhances Electronic Check Service to Benefit Multi-Lane Retailers," Business Wire, Nov. 28, 2006, 2 pgs.
Quinn and Roberds, *The Evolution of the Check as a Means of Payment: A Historical Survey*, Federal Reserve Bank of Atlanta, Economic Review, 2008, 30 pgs.
Rockwell, *The Megapixel Myth*, KenRickwell.com, 2008, located on the Internet at: http://kewrockwell.com.tech/mpmyth.htm, 6 pgs.
Shah, *Moore's Law*, Continuous Everywhere But Differentiable Nowhere, Feb. 12, 2009, located on the Internet at: http://samjshah.com/2009/02/24/morres-law/, 5 pgs.
Sumits, *Major Mobile Milestones—The Last 15 Years, and the Next Five*, Cisco Blogs, Feb. 3, 2016, located on the Internet at: https://blogs.cisco.com/sp/mobile-vni-major-mobile-milesrones-the-last15-years-and-the-next-five, 12 pgs.
Wausau Financial Systems, *Understanding Image Quality & Usability Within a New Environment*, 2006, 22 pgs.
"Exchangeable image file format for digital still cameras: Exif Version 2.2," Standard of Electronics and Information Technology Industries Associate, JEITA CP-3451, Technical Standardization Committee on AV & IT Storage Systems and Equipments, Japan Electronics and Information Technology Industries Association, Apr. 2002, 154 pgs. (retrieved from: http://www.exif.org/Exif2-2.PDF).

Aradhye, Hrishikesh B., "A Generic Method for Determining Up/Down Orientation of Text in Roman and Non-Roman Scripts," Pattern Recognition Society, Dec. 13, 2014, 18 pgs.
Bills, Steve, "Automated Amount Scanning Is Trend in Remote-Deposit," American Banker, New York, NY, Aug. 30, 2005, 3 pgs.
Braun, Tim, "Camdesk—Towards Portable and Easy Document Capture," Image Understanding and Pattern Recognition Research Group, Department of Computer Science, University of Kaiserslautern, Technical Report, Mar. 29, 2005, 64 pgs. (Retrieved from: https://pdfs.semanticscholar.org/93b2/ea0d12f24c91f3c46fa1c0d58a76bb132bd2.pdf).
Bruene, Jim; "Check Free to Enable In-Home Remote Check Deposit for Consumers and Small Business", NetBanker. Com, Financial Insite, Inc., http://www. netbanker.com/2008/02/checkfree_to_enableinhome_rem.html, Feb. 5, 2008, 3 pgs.
Craig, Ben, "Resisting Electronic Payment Systems: Burning Down the House?", Federal Reserve Bank of Cleveland, Jul. 1999, 4 pgs.
Credit Union Management, "When You wish Upon an Imaging System . . . the Right Selection Process can be the Shining Star," Credit Union Management, Aug. 1993, printed from the internet at <http://search.proquest.com/docview/227756409/14138420743684F7722/15?account id=14 . . . >, on Oct. 19, 2013, 11 pgs.
Iida, Jeanne, "The Back Office: Systems—Image Processing Rolls on as Banks ReapBenefits," American Banker, Jul. 19, 1993, printed from the internet at <http://search.proquest.com/docview/292903245/14138420743684F7722/14?account id=14 . . . >, on Oct. 19, 2013, 3 pgs.
Lampert, Christoph et al., "Oblivious Document Capture and Real-Time Retrieval," International Workshop on Camera Based Document Analysis and Recognition (CBDAR), 2005, 8 pgs. (Retrieved from: http://www-cs.ccny.cuny.edu/~wolberg/capstone/bookwarp/LampertCBDAR05.pdf).
Liang, Jian et al., Camera-Based Analysis of Text and Documents: A Survey, International Journal on Document Analysis and Recognition, Jun. 21, 2005, 21 pgs.
Luo, Xi-Peng et al., "Design and Implementation of a Card Reader Based on Build-In Camera," Proceedings of the 17th International Conference on Pattern Recognition, 2004, 4 pgs.
Vaream, Craig, "Image Deposit Solutions: Emerging Solutions for More Efficient Check Processing," JP Morgan Chase, Nov. 2005, 16 pgs.
Wade, Will, "Early Debate on Remote-Capture Risk," American Banker, New York, NY, May 26, 2004, 3 pgs.
Zandifar, A., "A Video-Based Framework for the Analysis of Presentations/Posters," International Journal on Document Analysis and Recognition, Feb. 2, 2005, 10 pgs.
"Quicken Bill Pay", Retrieved from the Internet on Nov. 27, 2007 at: <URL:http://quicken intuit.com/quicken-bill-pay-jhtml>, 2 pgs.
"Start to Simplify with Check Imaging a Smarter Way to Bank", Retrieved from the Internet on Nov. 27, 2007, at: <URL: http://www.midnatbank.com/Internet%20Banking/internet_Banking.html>, 3 pgs.
Motomanual, MOTOROKR-E6-GSM-English for wireless phone, copyright 2006, 144 pgs.
CBM2019-00005 U.S. Pat. No. 8,699,779, Patent Owner's Sur-Reply Brief to Petitioner's Reply Brief to Patent Owner Preliminary Response Pursuant to Authorization Provided in Paper No. 15, dated May 1, 2019, 7 pgs.
CBM2019-00004 U.S. Pat. No. 8,977,571, Defendant's Claim Construction Brief and supporting exhibits, *United Services Automobile Association v. Wells Fargo Bank, N.A.*, Civil Action No. 2:18-cv-245, dated Apr. 25, 2019, 186 pgs.
USAA's Opening Claim Construction Brief, *United Services Automobile Association v. Wells Fargo Bank, N.A.*, Civil Action No. 2:18-cv-245, dated Apr. 11, 2019, 32 pgs.
CBM2019-00004 U.S. Pat. No. 8,977,571, Patent Owner's Sur-Reply Brief-to Petitioner's Reply Brief to Patent Owner Preliminary Response Pursuant to Authorization Provided in Paper 14, dated Apr. 30, 2019, 7 pgs.
USAA's Reply to Claim Construction Brief, *United Services Automobile Association v. Wells Fargo Bank, N.A.*, Civil Action No. 2:18-cv-245, dated May 2, 2019, 15 pgs.

(56) References Cited

OTHER PUBLICATIONS

CBM2019-00005 U.S. Pat. No. 8,899,779, Patent Owner's Sur-Reply Brief Pursuant to Petitioner's Reply Brief to Patent Owner Preliminary Response Pursuant to Authorization Provided in Paper 15, dated May 1, 2019, 7 pgs.
P.R. 4-3 Joint Claim Construction and Pre-Hearing Statement, *United Services Automobile Association v. Wells Fargo Bank, N.A.*, Civil Action No. 2:18-cv-366, dated Apr. 5, 2019, 190 pgs.
Defendant Wells Fargo Bank, N.A.'s Amended Answer, Affirmative Defenses, and Counterclaims to Plaintiff's Complaint, *United Services Automobile Association v. Wells Fargo Bank, N.A.*, Civil Action No. 2:18-cv-366, dated Apr. 12, 2019, 32 pg.
Plaintiff and Counterclaim Defendant's Answer to Defendant and Counterclaims Plaintiff's Amended Answer, Affirmative Defenses, & Counterclaims, *United Services Automobiie Association v. Wells Fargo Bank, N.A.*, Civil Action No. 2:18-cv-366, dated Apr. 26, 2019, 18 pgs.
P.R. 4-3 Joint Claim Construction and Pre-Hearing Statement, *United Services Automobile Association v. Wells Fargo Bank, N.A.*, Civil Action No. 2:18-cv-245, dated Feb. 28, 2019, 122 pgs.
Defendant Wells Fargo Bank, N.A.'s Amended Answer, Affirmative Defenses, and Counterclaims to Plaintiff's Amended Complaint, *United Services Automobile Association v. Wells Fargo Bank, N.A.*, Civil Action No. 2:18-cv-245, dated Mar. 7, 2019, 75 pgs.
Plaintiff and Counterclaim Defendant's Answer to Defendant and Counterclaims Plaintiffs Amended Answer, Affirmative Defenses, & Counterclaims, *United Services Automobiie Association v. Wells Fargo Bank, N.A.*, Civil Action No. 2:18-cv-245, dated Mar. 21, 2019, 36 pgs.
USAA's Reply Claim Construction Brief, *United Services Automobile Association v. Wells Fargo Bank, N.A.*, Civil Action No. 2:18-cv-245, dated May 2, 2019, 25 pgs.
Parties' P.R. 4-5(D) Joint Claim Construction Chart, *United Services Automobile Association v. Wells Fargo Bank, N.A.*, Civil Action No. 2:18-cv-245, dated May 9, 2019, 25 pgs.
Patent Disclaimer for U.S. Pat. No. 8,699,779, filed on Mar. 4, 2019, 2 pgs.
Patent Disclaimer for U.S. Pat. No. 8,977,571, filed on Feb. 20, 2019, 2 pgs.
Patent Disclaimer for U.S. Pat. No. 9,336,517, filed on Mar. 4, 2019, 2 pgs.
Patent Disclaimer for U.S. Pat. No. 9,818,090, filed on Feb. 20, 2019, 2 pgs.
CBM2019-00002 U.S. Pat. No. 9,819,090, United Services Automobile Association (USAA)'s Patent Owner Preliminary Response, dated Feb. 20, 2019, 75 pgs.
CBM2019-00002 U.S. Pat. No. 9,818,090, Declaration of Tim Crews in Support of Patent Owner Preliminary Response, dated Feb. 20, 2019, 8 pgs.
CBM2019-00002 U.S. Pat. No. 9,818,090, Deciaration of Matthew Calman in Support of Patent Owner Preliminary Response, dated Feb. 20, 2019, 14 pgs.
CBM2019-00002 U.S. Pat. No. 9,818,090, Katie Knight Videotape Deposition Transcript, dated Feb. 8, 2019, 27 pgs.
CBM2019-00002 U.S. Pat. No. 9,818,090, Peter Alexander, Ph.D., Oral and Videotaped Deposition, dated Jan. 23, 2019, 27 pgs.
CBM2019-00002 U.S. Pat. No. 9,818,090, United Services Automobile Association (USAA)'s Updated Exhibit List, dated Mar. 19, 2019,pgs.
CBM2019-00003 U.S. Pat. No. 9,336,517, United Services Automobile Association (USAA)'s Patent Owner Preliminary Response, dated Mar. 4, 2019, 91 pgs.
CBM2019-00003 U.S. Pat. No. 8,699,779, Declaration of Matthew Calman in Support of Patent Owner Preliminary Response, dated Mar. 4, 2019, 15 pgs.
CBM2019-00003 U.S. Pat. No. 9,336,517, Katie Knight Videotape Deposition Transcript, dated Feb. 8, 2019, 27 pgs.
CBM2019-00003 U.S. Pat. No. 9,336,517, Peter Alexander, Ph.D., Oral and Videotaped Deposition, dated Jan. 23, 2019, 27 pgs.

CBM2019-00003 U.S. Pat. No. 9,336,517, United Services Automobile Association (USAA)'s Updated Exhibit List Pursuant to 37 CFR 42.63(e), dated Mar. 19, 2019, 8 pgs.
CBM2019-00003 U.S. Pat. No. 9,336,517, Petitioner's Reply Brief to Patent Owner Preliminary Response Pursuant to Authorization Provided in Paper No. 14, dated Apr. 10, 2019, 10 pgs.
CBM2019-00004 U.S. Pat. No. 8,977,571, Declaration of Tim Crews in Support of Patent Owner Preliminary Response, dated Feb. 20, 2019, 8 pgs.
CBM2019-00004 U.S. Pat. No. 8,977,571, United Services Automobile Association (USAA)'s Patent Owner Preliminary Response, dated Feb. 20, 2019, 99 pgs.
CBM2019-00004 U.S. Pat. No. 8,977,571, Deciaration of Matthew Calman in Support of Patent Owner Prelinlinary Response, dated Feb. 20, 2019, 14 pgs.
CBM2019-00004 U.S. Pat. No. 8,977,571, United Services Automobile Association (USAA)'s Updated Exhibit List Pursuant to 37 CFR 43.63(e), dated Mar. 19, 2019, 8 pgs.
CBM2019-00005 U.S. Pat. No. 8,699,779, United Services Automobile Association's. (USAA)'s Patent Owner Preliminary Response, dated Mar. 4, 2019, 103 pgs.
CBM2019-00005 U.S. Pat. No. 8,699,779, Katie Knight Videotape Depostion Transcript, dated Feb. 8, 2019, 27 pgs.
CBM2019-00005 U.S. Pat. No. 8,699,779 Matthew A. Calman Declaration, dated Mar. 4, 2019, 15 pgs.
CBM2019-00005 U.S. Pat. No. 8,699,779 Peter Alexander, Ph.D., Oral and Videotaped Deposition, dated Jan. 23, 2019, 27 pgs.
CBM2019-00027 U.S. Pat. No. 9,224,136 Declaration of Peter Alexander, Ph.D., dated Mar. 28, 2019, 147 pgs.
CBM2019-00027 U.S. Pat. No. 9,224,136 Petition for Covered Business Method Review of Claims 1-3, 5-9, 11-16 and 18 of U.S. Pat. No. 9,224,136, dated Mar. 28, 2019, 93 pgs.
CBM2019-00027 U.S. Pat. No. 9,224,136 Notice of Filing Date Accorded to Petition and Time for Filing Patent Owner Preliminary Response, dated Apr. 8, 2019, 3 pgs.
CBM2019-00028 U.S. Pat. No. 10,013,681, Plaintiff United Services Automobile Association (USAA) Preliminary Claim Constructions and Extrinsic Evidence, dated Mar. 15, 2019, 74 pgs.
CBM2019-00028 U.S. Pat. No. 10,013,881, Declaration of Peter Alexander, Ph.D., dated Mar. 28, 2019, 94 pgs.
CBM2019-00028 U.S. Pat. No. 10,013,681, Petition for Covered Business Method Review of Claims 1-30 of U.S. Pat. No. 10,013,681, dated Mar. 28, 2019, 99 pgs.
CBM2019-00028 U.S. Pat. No. 10,013,681, Petitioner's Updated Exhibit List (as of Apr. 1, 2019) for U.S. Pat. No. 10,013,681, dated Apr. 1, 2019, 5 pgs.
CBM2019-00028 U.S. Pat. No. 10,013,681, Notice of Filing Date Accorded to Petition and Time for Filing Patent owner Preliminary Response for U.S. Pat. No. 10,013,681, dated Apr. 8, 2019, 3 pgs.
CBM2019-00029 U.S. Pat. No. 10,013,605, Declaration of Peter Alexander, Ph.D., dated Mar. 28, 2019, 76 pgs.
CBM2019-00029 U.S. Pat. No. 10,013,605, Petition for Covered Business Method Review of Claims 1-3, 5-14, 16-29 of U.S. Pat. No. 10,013,605, dated Mar. 28, 2019, 88 pgs.
CBM2019-00029 U.S. Pat. No. 10,013,605; Plaintiff United Services Automobile Association (USAA) Preliminary Claim Constructions and Extrinsic Evidence; dated Mar. 15, 2019, 74 pgs.
IPR2019-00815 U.S. Pat. No. 9,818,090, Petition for Inter Partes Review of Claims 109 of U.S. Pat. No. 9,818,090, dated Mar. 20, 2019, 56 pgs.
IPR2019-00815 U.S. Pat. No. 9,818,090, Declaration of Peter Alexander, PhD. as filed in the IPR on Mar. 20, 2019, 99 pgs.
IPR2019-00815 U.S. Pat. No. 9,818,090, Notice of Filing Date Accorded to Petition and Time for Filing Patent Owner Preliminary Response, dated Mar. 27, 2019, 5 pgs.
IPR2019-00815 U.S. Pat. No. 9,818,090, Exhibit B Proposed Claim Constructions for the '571, '090, '779 and '517 Patents, filed on Feb. 28, 2019, 10 pgs.
ABA Routing System Transit Number, Wikipedia, dated Sep. 27, 2006, 3pgs.
Accredited Standards Committee Technical Report TR 33-2006, dated Aug. 28, 2006, 75 pgs.

(56) References Cited

OTHER PUBLICATIONS

ANS X9.100-140-2004, "Specification for an Image Replacement document—IRD", American Standard for Financial Services, Oct. 1, 2004, 15 pgs.
ANSI News, Check 21 Goes Into Effect Oct. 28, 2004, dated Oct. 25, 2004, 1 pg.
ANSI, "Return Reasons for Check Image Exchange of IRDS", dated May 6, 2016, 23 pgs.
ANSI, "Specifications for Electronic Exchange of Check and Image Data", dated Jul. 11, 2006, 230 pgs.
ANSI X9.7-1999(R2007), Bank Check Background and Convenience Amount Field Specification, dated Jul. 11, 2007, 86 pgs.
ASCX9, "Specification for Electronic Exchange of Check and Image Data", date Mar. 31, 2003. 156 pgs.
Bankers' Hotline, "Training Page: Learning the Bank Numbering System", Copyright 2004, 2 pgs.
BrainJar Validation Algorithms, archived on Mar. 16, 2016 from BrainJar.com, 2 pgs.
Canon White Paper, "Two Words Every Business Should Know: Remote Deposit", dated 2005, 7 pgs.
CBR oniine, "Diebold launches ATM depository technology", Oct. 4, 2007, 5 pgs.
Cheq Information Technology White Paper, "Teller Scanner Performance and Scanner Design Camera Position Relative to the Feeder", dated 2005, 7 pgs.
De Jesus, Angie et al., "Distributed Check Processing in a Check 21 Environment", dated Nov. 2004, 22 pgs.
Federal Reserve Adoption of DSTU X9.37-2003, Image Cash Letter Customer Documentation Version 1.8, dated Oct. 1, 2008, 48 pgs.
Fielding, R. et al, "RFC-2616—Hypertext Transfer Protocol", Network Working Group, The Internet Society copyright 1999, 177 pgs.
Hill, Simon, "From J-Phone to Lumia 1020: A Complete History of the Camera Phone", dated Aug. 11, 2013, 19 pgs.
Instrument—Definition from the Merriam-Webster Online Dictionary, dated Mar. 2, 2019, 1 pg.
Instrument—Definition of instrument from the Oxford Dictionaries (British & World English), dated Jul. 2, 2017, 44 pgs.
iPhone Application Programming Guide Device Support, dated Apr. 26, 2009, 7 pgs.
iPhone Announces the New iPhone 3gs—The Fastest, Most Powerful iPhone Yet, Press Release dated Jun. 8, 2009, 4 pgs.
Klein, Robert, Financial Services Technology, "Image Quality and Usability Assurance: Phase 1 Project", dated Jul. 23, 2004, 68 pgs.
Lange, Bill, "Combining Remote Capture and IRD Printing, A Check 21 Strategy for Community and Regional Banks", dated 2005, 25 pgs.
Lee, Jeanne, "Mobile Check Deposits: Pro Tips to Ensure They Go Smoothly", dated Feb. 19, 2016, 6 pgs.
Meara, Bob, "State of Remote Deposit Capture 2015: Mobile is the New Scanner", Dated May 26, 2015, obtained from the Internet at: https://www.celent.com/insights/57842967, 3 pgs.
Meara, Bob, "State of Remote Deposit Capture 2015 Mobile is the New Scanner", dated May 2015, 56 pgs.
Meara, Bob,"USAA's Mobile Remote Deposit Capture", Dated Jun. 26, 2009, 2 pgs.
Mitek's Mobile Deposit Processes More Than Two Biliion Checks, $1.5 Trillion in Cumulative Check Value, dated Mar. 18, 2018, 2 pgs.
Mitek, "Video Release—Mitek MiSnap™ Mobile Auto Capture Improves Mobile Deposit® User Experience at Ten Financial Institutions", dated Jul. 15, 2014, 2 pgs.
NCR, Mobile Remote Deposit Capture (RDC), copyright 2011, 8 pgs.
Nokia N90 Review Digital Trends, dated Feb. 11, 2019, obtained from the Internet at: https://www.digitaltrends.com/cell-phone-reviews/nokia-n90-review/. 11 pgs.
Nokia N95 8GB User Guide, copyright 2009, (from the Wells Fargo Bank, N.A. IPR2019-00815, filed on Mar. 20, 2019), Part 1 of 3, 67 pgs.
Nokia N95 8GB User Guide, copyright 2009, (from the Wells Fargo Bank, N.A. IPR2019-00815, filed on Mar. 20, 2019), Part 2 of 3, 60gs.
Nokia N95 8GB User Guide, copyright 2009, (from the Wells Fargo Bank, N.A. IPR2019-00815, filed on Mar. 20, 2019), Part 3 of 3, 67 pgs.
Patel, Kunur, Ad Age, "How Mobile Technology is Changing Banking's Future", dated Sep. 21, 2009, 3 pgs.
Remote Deposit Capture Basic Requirements, dated Aug. 22, 2009, 1 pg.
Remote Deposit Capture.com Scanner Matrix, dated Oct. 21, 2011, 3 pgs.
Rowles, Tony, *USAA v. Wells Fargo*, No. 2:16-cv-245-JRG: e-mail correspondence dated Jan. 24, 2019, 2 pgs.
Sechrest, Stuart et al., "Windows XP Performance", Microsoft, dated Jun. 1, 2001, 20 pgs.
Spenser, Harvey, "White Paper Check 21 Controlling Image Quality at the Point of Capture", dated 2004, 7 pgs.
Timothy R. Crews list of Patents, printed from the United States Patent and Trademark Office on Feb. 13, 2019, 7 pgs.
Van Dyke, Jim, "2017 Mitek Mobile Deposit Benchmark Report", copyright 2017, 50 pgs.
Wausau, "Understanding Image Quality & Usability Within a New Environment", copyright 2019, 1 pg.
Whitney, Steve et al., "A Framework for Exchanging Image Returns", dated Jul. 2001, 129 pgs.
Petition filed by Wells Fargo Bank, N.A. for Covered Business Method Review of Claims 1-20 of U.S. Pat. No. 9,818,090, dated Nov. 8, 2018, 90 pgs.
Petition filed by Wells Fargo Bank, N.A. for Covered Business Method Review of Claims 1-20 of U.S. Pat. No. 9,336,517, dated Nov. 8, 2018, 98 pgs.
Petition filed by Wells Fargo Bank, N.A. for Covered Business Method Review of Claims 1-20 of U.S. Pat. No. 8,977,571, dated Nov. 8, 2018, 95 pgs.
Petition filed by Wells Fargo Bank, N.A. for Covered Business Method Review of Claims 1-23 of U.S. Pat. No. 8,699,779, dated Nov. 8, 2018, 101 pgs.
Wells Fargo's Objections to Magistrate Judge Payne's Claim Construction Memorandum and Order, filed in Civil Action No. 2:18-CV-245, dated Jun. 27, 2019, 7 pgs.
USAA's Objections to Magistrate Judge Payne's Claim Construction Memorandum Opinion and Order, filed in Civil Action No. 2:18-CV-245, dated Jun. 27, 2019, 6 pgs.
Parties' P.R. 4-5(D) Joint Claim Construction Chart, filed in Civil Action No. 2:18-CV-366, dated Jun. 18, 2019, 27 pgs.
IPR2019-00815, Invalidity Chart, uploaded on Jun. 27, 2019, 94 pgs.
IPR2019-00815, United Services Automobile Association ("USAA")'s Patent Owner Preliminary Response, dated Jul. 27, 2019, 66 pgs.
IPR2019-00815, Supplemental Invalidity Chart, dated on Jun. 27, 2019, 16 pgs.
IPR2019-00815, Declaration of Matthew A. Calman in Support of Patent Owner Preliminary Response, dated Jun. 27, 2019, 25 pgs.
CBM2019-00003 Patent No. 9,336,517, United Services Automobile Association ("USAA")'s Updated Exhibit List, dated May 13, 2019, 9 pgs.
CBM2019-00003 U.S. Pat. No. 9,336,517, Petitioner's Updated Exhibits List, dated May 14, 2019, 7 pgs.
CBM2019-00002 U.S. Pat. No. 9,818,090, Decision Denying Institution of Covered Business Method Patent Review 37 C.F.R. § 42.208, dated Apr. 26, 2019, 5 pgs.
CBM2019-00003 Patent No. 9,336,517, Decision Denying Institution of Covered Business Method Patent Review 37 C.F.R. § 42.208, dated Jun. 3. 2019, 28 pgs.
CBM2019-00004 U.S. Pat. No. 8,977,571, Decision Denying Institution of Covered Business Method Patent Review 37 C.F.R. § 42.208, dated May 15, 2019, 33 pgs.
CBM2019-00005 Patent No. 8,699,779, Decision Denying Institution of Covered Business Method Patent Review 37 C.F.R. § 42.208, dated Jun. 3. 2019, 27 pgs.
USAA's Opening Claim Construction Brief, filed in Civil Action No. 2118-CV-366, dated May 17, 2019, 670 pgs.

(56) References Cited

OTHER PUBLICATIONS

Defendant's Claim Construction Brief, filed in Civil Action No. 2:18-CV-366, dated May 31, 2019, 111 pgs.
Plaintiff's Notice of Filing Claim Construction Presentation, filed in Civil Action No. 2:18-CV-245, dated May 23, 2019, 106 pgs.
IPR2019-01081 U.S. Pat. No. 9,336,517, Petition for Inter Partes Review of Claims 1, 5-10, 12-14,17-20 of U.S. Pat. No. 9,336,517, dated Jun. 5, 2019, 78 pgs.
IPR2019-01082 U.S. Pat. No. 8,977,571, Petition for Inter Partes Review of Claims 1-13 U.S. Pat. No. 8,977,571, dated Jun. 5, 2019, 75 pgs.
IPR2019-01083 U.S. Pat. No. 8,699,779, Petition for Inter Partes Review of Claims 1-18 U.S. Pat. No. 8,699,779, dated Jun. 5, 2019, 74 pgs.
Plaintiff's Notice of Decisions Denying Institution of Covered Business Method Patent Review, filed in Civil Action No. 2:18-CV-245, dated Jun. 6, 2019, 61 pgs.
Claim Construction Memorandum Opinion and Order, filed in Civil Action No. 2:18-CV-245, dated Jun. 13, 2019, 48 pgs.
Parties' P.R.4-5(D) Join Claim Construction Chart, filed in Civil Action No. 2:18-CV-245, dated Jun. 14, 2019, 28 pgs.
USAA's Reply Claim Construction Brief, filed in Civil Action No. 2:13-CV-366, dated Jun. 7, 2019, 40 pgs.
CBM 2019-00027, Declaration of Bharat Prasad, dated Jul. 8, 2019, 32 pgs.
CBM 2019-00027, Patent Owner Preliminary Response and Exhibits 2001-1042, dated Jul. 8, 2019, 91 pgs.
CBM 2019-00028, United Services Automobile Association ("USAA")'s Patent Owner Preliminary Response, dated Jul. 8, 2019, 73 pgs.
CBM2019-00028, Declaration of Matthew A. Calman in Support of Patent Owner Preliminary Response, dated Jul. 8, 28 pgs.
CBM2019-00028, Malykhina, Elena "Get Smart", Copyright 2006 by ProQuest Information and Learning Company, 6 pgs.
CBM2019-00028, Palm Treo 700W Smartphone manual, Copyright 2005 by Palm, Inc., 96 pgs.
CBM2019-00028, 00000 C720w User Manual for Windows Mobile Smart Phone, Copyright 2006, 352 pgs.
CBM2019-00028, "Smarter Than Your Average Phone", Copyright 2006 by Factiva, 4 pgs.
CBM2019-00028, "64 Million Smart Phones Shipped Worldwide in 2006", Canalys Newsroom, 2006, 3 pgs.
CBM2019-00028, Nokia 9500 Communicator user Guide, Copyright 2006 by Nokia Corporation, 112 pgs.
CBM2019-00028, Robinson, Daniel, "ClientWeek—Handsets advance at 3GSM", Copyright 2004 by VNU Business Publications Ltd., 2 pgs.
CBM2019-00028, Burney, Brett "MacBook Pro with Intel processor is fast, innovative", Copyright 2006 by Plain Dealer Publishing Co., 2 pgs.
CBM2019-00028, 17-inch MacBook Pro User's Guide, Copyright 2006 by Apple Computer, Inc., 144 pgs.
CBM2019-00028, Wong, May "HP unveils new mobile computers", Copyright 2006 by The Buffalo News, 2 pgs.
CBM2019-00028, Jewell, Mark "Cell Phone Shipments Reach Record 208M", Copyright 2005 by Associated Press, 1 pg.
CBM 2019-00028, Lawler, Ryan "Apple shows Intel-based Macs, surge in revenue", Copyright 2006 by The Yomiuri Shimbun, 2 pgs.
CBM 2019-00028, Aspire 9800 Series User Guide, Copyright 2006 by Acer International, 122 pgs.
CBM 2019-00028, Dell XPS M1210 Owner's Manual, Copyright 2006 by Dell Inc., 192 pgs.
CBM 2019-00028, Estridge, Bonnie "Isyour phone smart enough?: The series that cuts through the technobabble to bring you the best advice on the latest gadgets", Coyright 2006 by Xpress—A1 Nsr Media, 3 pgs.
CBM 2019-00028, "Motorola, Palm collaborate on smart phone", Copyright 2000 by Crain Communications, Inc., 1 pg.
CBM 2019-00028, Nasaw, Daniel "Viruses Pose threat to 'Smart' Cellphones—Computer Programs Could Cripple Devices and Shut Down Wireless Networks", Copyright 2004 by Factiva, 2 pgs.
CBM 2019-00028, Seitz, Patrick "Multifunction Trend Shaking Up the Handheld Device industry; Solid Sales Expected in 2004; PDA, handset, camera—one single, small product can fill a variety of roles", Copyright 2004 Investor's Business Daily, Inc., 3 pgs.
Microsoft Mobile Devices Buyer's Guide, 2012, 4 pgs.
Microsoft Mobile Devices Smartphone, 2003, 2 pgs.
Plaintiff's Notice of Decision Denying Institution of Covered Business Method Patent Review, filed in Civil Action No. 2:18-CV-245, dated May 15, 2019, 36 pgs.
Defendant's Claim Construction Brief, filed in Civil Action No. 2:18-CV-366, dated Jun. 24, 2019, 28 pgs.
CBM2019-00029, United Services Automobile Association (USAA)'s Patent Owner Preliminary Response, dated Jul. 17, 2019, 76 pgs.
CBM2019-00029, Declaration of Matthew A. Calman in Support of Patent Owner Preliminary Response, dated Jul. 17, 2019, 29 pgs.
CBM2019-00029, Defendant's Claim Construction Brief, filed in Civil Action No. 2:18-CV-366, dated May 31, 2019, 28 pgs.
CBM2019-00029, Palenchar, Joseph, "PDA Phone Adds WiFi VoIP, Turn-By-Turn GPS Navigation", Copyright 2006 by Reed Business Information, 2 pgs.
CBM2019-00029, HP User Guide, Additional Product Information, Copyright 2006 by Hewlett-Packard Development Company, L.P., 204 pgs.
CBM2019-00029, Pocket PC User Manual, Version 1, dated May 2006 by Microsoft, 225 pgs.
CBM2019-00029, "Dynamism.com: Take tomorrow's tech home today with Dynamism.com: Latest gadgets merge next generation technology with high style design", Copyright 2006 Normans Media Limited, 2 pgs.
IPR2019-00815, Federal Reserve Financial Services Retired: DSTU X9.37-2003, Specifications for Electronic Exchange of Check and Image Data, Copyright 2006 by Accredited Standards Committee X9, Inc., dated Mar. 31, 2003, 157 pgs.
IPR2019-01081, Declaration of Peter Alexander, Ph.D, dated Jun. 5, 2019, 135 pgs.

* cited by examiner

SYSTEMS AND METHODS FOR REMOTE DEPOSIT OF CHECKS

This application is a continuation of and hereby claims priority to pending U.S. patent application Ser. No. 14/220,799, entitled "Systems and Methods for Remote Deposit of Checks." filed on Mar. 20, 2014, which is a continuation of U.S. patent application Ser. No. 13/765,412, entitled "Systems and Methods for Remote Deposit of Checks," filed on Feb. 12, 2013, now U.S. Pat. No. 8,732,081 which is a continuation of U.S. patent application Ser. No. 12/963,513, filed on Dec. 8, 2010, now U.S. Pat. No. 8,392,332, which is a continuation of U.S. patent application Ser. No. 11/591,247 filed Oct. 31, 2006, now U.S. Pat. No. 7,873,200, all of which are incorporated by reference herein in their entirety.

CROSS-REFERENCE TO RELATED APPLICATIONS

This application is related by subject matter to U.S. patent application Ser. No. 11/591,014, U.S. patent application Ser. No. 11/590,971. U.S. patent application Ser. No. 11/590,963, U.S. patent application Ser. No. 11/591,025, U.S. patent application Ser. No. 11/591,003, and U.S. patent application Ser. No. 11/590,974, also entitled "Systems and Methods for Remote Deposit of Checks."

This application is also related by subject matter to U.S. patent application Ser. No. 11/321,025, U.S. patent application Ser. No. 11/321,027. U.S. patent application Ser. No. 11/320,998 all filed on Dec. 29, 2005.

BACKGROUND

As described in U.S. patent application Ser. No. 11/321,025, checks typically provide a safe and convenient method for an individual to purchase goods and/or services. To use a check, the individual usually must open a checking account, or other similar account, at a financial institution and deposit funds, which are then available for later withdrawal. To pay for goods and/or services with a check, the payor (i.e., the buyer) usually designates a payee (i.e., the seller) and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee in return for the goods and/or services provided by the payee.

Checks have certain advantages over other forms of payment, such as cash. For example, while often considered the most liquid type of asset, cash also may be the least secure. Unlike a check, cash is usually freely transferable and does not have to be endorsed. Thus, the owner and possessor of cash is most often the same individual. Because cash is freely transferable, cash that is lost or stolen typically cannot be recovered. Therefore, the risks associated with cash transactions are often unacceptable, particularly with respect to transactions not conducted in person (e.g., by mail) and/or involving large sums of money. A check, on the other hand, provides a payor with more security because the check usually requires a payor to specify both the person and amount to be paid. Furthermore, as noted above, the check is usually not valid until it is properly signed by the payor. These safeguards help to reduce the risk that money will be lost and/or stolen and ensure that the proper payee receives the proper amount of money.

Cash may have other disadvantages as well. For example, because cash is freely transferable, there may be little or no verifiable transaction history. It is often desirable for a payor and/or payee to have physical proof that a particular transaction took place. This typically requires that the payor receive a receipt. However, receipts may contain errors and can be easily misplaced. In contrast, a bank processing a check will ordinarily create a transaction history, which may include the identity of the payee, the amount to be paid, the date of the payment, and the signature of the payor. This enables both a payor and payee to independently verify the accuracy of most transactions involving a payment by check.

While a check may provide a payor with a convenient and secure form of payment, receiving a check may put certain burdens on the payee, such as the time and effort required to deposit the check. For example, depositing a check typically involves going to a local bank branch and physically presenting the check to a bank teller. In addition to the time commitment that may be required, visiting a bank branch may be problematic for the payee if the bank's hours of operation coincide with the payee's normal hours of employment. Thus, the payee may be required to leave work early and/or change work schedules.

A check may pose other burdens for the payee. As noted above, a check may not be freely transferable, thereby limiting the payee's ability to use funds from the check. For example, it is usually difficult to for the payee to purchase goods and/or services using a check issued by the payor. While the check may be endorsed and accepted by a third party, such transactions are often disfavored because the third party may not know the payor and, thus, may not be willing to accept the risk that the payor has insufficient funds to cover the check. Therefore, the payee may not have access to the funds from the check until the payee deposits the check at the bank, the check has cleared and the funds have been credited to the payee's account. The payee may have to wait even longer if the payee chooses to deposit the check by mail. Therefore, there is a need for a convenient method of remotely depositing a check while enabling the payee to quickly access the funds from the check.

SUMMARY

The described embodiments contemplate a system, method and computer-readable medium with computer-executable instructions for remotely redeeming a negotiable instrument. In an embodiment, the novel method may include delivering, via a publicly accessible computer network, a software component to a customer-controlled general purpose computer. The customer is instructed to identify an account via said computer, and to provide an image of at least a front side of a check, for example by scanning the check and appropriately rotating and cropping the scanned image as necessary. The image passes from scanner or other image capture apparatus to the software component, which manages delivery to bank servers.

In another embodiment, the novel method may include receiving, at a server computer, a customer request for a customer capability to make at least one check deposit from a customer-controlled general purpose computer. The software component for facilitating a check image capture process is then delivered to the customer. A customer identification of an account for a deposit and an image of a front side of a check is received, and optical character recognition (OCR) is performed on a Magnetic Ink Character Recognition (MICR) line location of the image. The received information and OCR information can be used in completing the deposit.

In another embodiment, the novel method may include receiving a customer identification of an account for a deposit, receiving a first image of a front side of a check, wherein said first image is in a first file format, e.g. JPEG, and wherein said first image is received from a customer-controlled general purpose computer. A second image of said front side of a check may then be created by converting said first image into a second file format, e.g. a bi-tonal TIFF. A log file may be generated comprising one or more of said first image and said second image, in addition to a variety of other potentially useful information for processing and/or troubleshooting the deposit transaction.

Additional advantages and features of the invention are described below.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
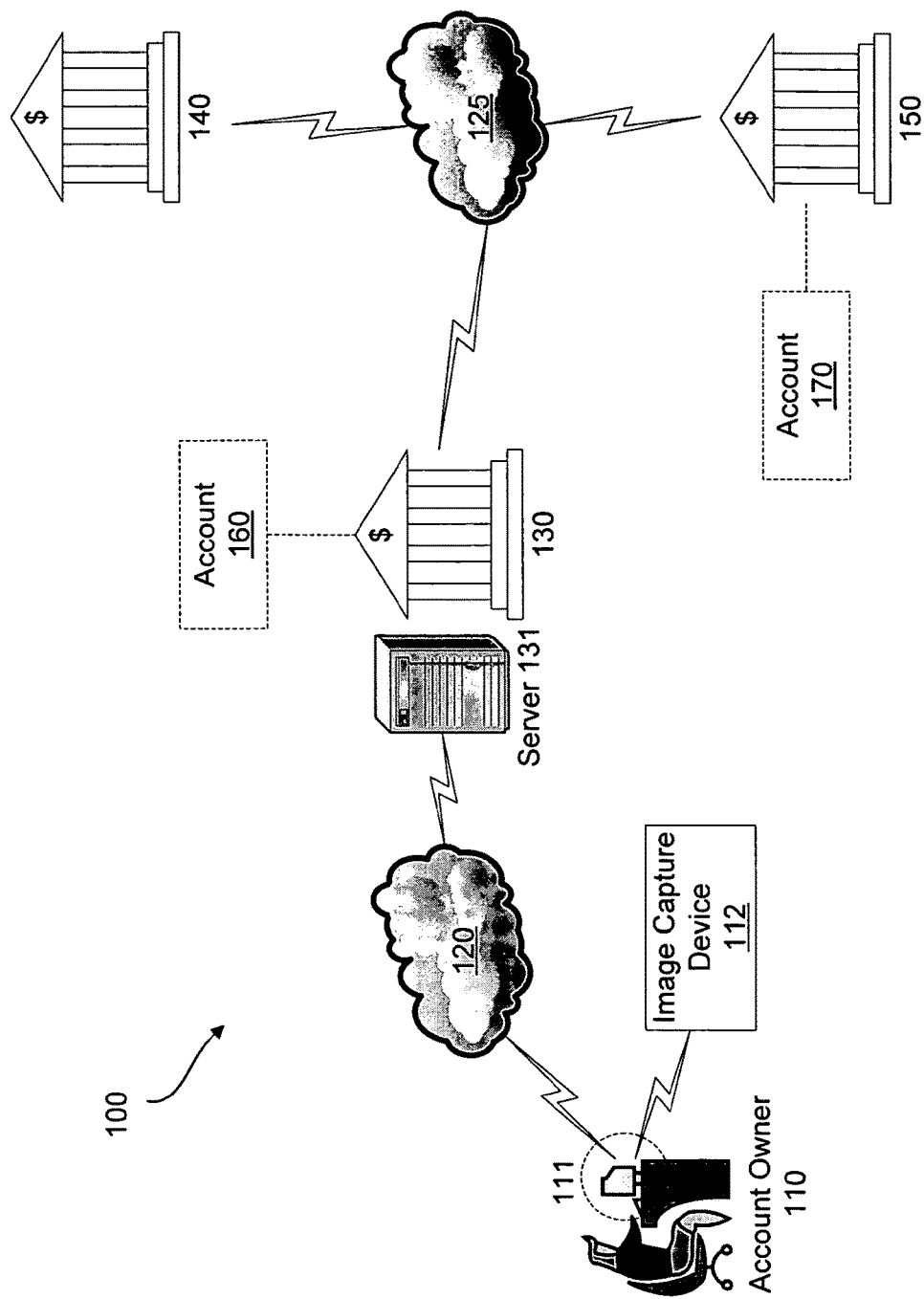
FIG. 1 illustrates a broad view of a system in which the described embodiments may be employed.

FIG. 1 illustrates an example system in which the described embodiments may be employed. System 100 may include account owner 110, e.g., a bank customer who may be located, for example, at the customer's private residence. The account owner 110 may be utilizing a customer-controlled, general purpose computer 111. A general purpose computer 111 is generally a Personal Computer (PC) running one of the well-known WINDOWS® brand operating systems made by MICROSOFT® Corp., or a MACIN-TOSH® (Mac) brand computer, running any of the APPLE® operating systems. General purpose computers are ubiquitous today and the term should be well understood. A general purpose computer 111 may be in a desktop or laptop configuration, and generally has the ability to run any number of applications that are written for and compatible with the computer's operating system. The term "general purpose computer" specifically excludes specialized equipment as may be purchased by a business or other commercial enterprise, for example, for the specialized purpose of high-speed, high-volume check deposits. A particular advantage of embodiments of the invention is its ability to operate in conjunction with electronics that today's consumers actually own or can easily acquire, such as a general purpose computer, a scanner, and a digital camera.

General purpose computer 111 may also be "customer-controlled." A common example of a customer-controlled computer would be a typical computer located in a private residence. The owner of such a computer typically has the power to install programs and configure the computer as they wish, subject to certain security restrictions that may be imposed by the hardware or software manufacturers. A customer-controlled computer need not be located in a private residence, however. For example, computers in college dormitories, in workplace offices, and so forth may also be considered to be "customer-controlled."

An example of a computer that would not be considered customer-controlled would be an Automatic Teller Machine (ATM) that is typically controlled by a bank or other business. Although a customer may access and utilize an ATM machine, the ATM machine is not customer-controlled because the allowed uses of the ATM machine are highly restricted. Relevant factors in determining whether a machine is customer controlled are thus the scope of operations that a customer may perform using the machine, and extent to which the customer can reconfigure the machine in some way by adding software and/or hardware components.

One of the applications that may run on a general purpose computer 111 in connection with the invention is a browser. Common browsers in use today are, for example, the popular INTERNET EXPLORER® line of browsers made by MICROSOFT® Corp., the FIREFOX® browsers distributed via the MOZILLA® open source project, and the NETSCAPE NAVIGATOR® browsers also distributed via the MOZILLA® open source project. Browsers generally allow users to point to a Uniform Resource Locator (URL), and thereby retrieve information such as a web page. For example, a browser application on computer 111 could retrieve a web page that is kept at server 131, and display the web page to the account owner 110, as is generally known and appreciated in the industry and by the general public.

Another application, or set of applications, that may run on a general purpose computer 111 in connection with the invention comprises "virtual machine" technologies such as the JAVA® virtual machine software distributed by SUN MICROSYSTEMS® Corp, and .NET® Framework distributed by MICROSOFT® Corp. In general, such applications facilitate execution of computer programs in a variety of computing environments. For example, a JAVA® applet is a computer program (which may be alternatively referred to herein as a "software component") that can execute on any computer running the JAVA® virtual machine software. The applet may be provided to virtual machine software in a "source code" format, and may be compiled by a "just in time" compiler, so as to put the applet in a form that can be executed by the hardware associated with the particular computing device. These technologies are known in the art and may be utilized in connection with certain embodiments of the invention as described herein.

An image capture device 112 may be communicatively coupled to the computer 112. Image capture device may be, for example, a scanner or digital camera. Computer 111 may comprise software that allows the user to control certain operations of the image capture device 112 from the computer 111. For example, modern scanner users may be familiar with the TWAIN software often used to control image capture from a computer 11*l*. Similarly, digital cameras often ship along with software that allows users to move images from the camera to a computer 111, and may also provide additional functions, such as photo editing functions crop and rotate.

Financial institutions 130, 140 and 150 may be any type of entity capable of processing a transaction involving a negotiable instrument. For example, financial institutions 130, 140 and 150 may be a retail bank, investment bank, investment company, regional branch of the Federal Reserve, clearinghouse bank and/or correspondent bank. A negotiable instrument is usually a type of contract that obligates one party to pay a specified sum of money to another party. By way of example, and not limitation, negotiable instruments may include a check, draft, bill of exchange, promissory note, and the like.

Financial institution 130 is illustrated as associated with a server 131. Financial institution 130 may maintain and operate server 131 for the purposes of communicating with customers such as 110. Alternatively, such server may be maintained and operated by one or more third party vendors who act under the instructions of the financial institution 130, but possess skills and resources that may be more effective in competent operation of electronics. Such arrangements are well known in the industry and in this case the server 131 is nonetheless considered to be "associated" with the financial institution 130.

Account owner 110 may be an individual who owns account 160, which may be held at financial institution 130. As such, account owner 110 may be described as a customer of financial institution 130. Account 160 may be any type of account for depositing funds, such as a savings account, checking account, brokerage account, and the like. Account owner 110 may communicate with financial institution 130 by way of communication network 120, which may include an intranet, the Internet, a local area network (LAN), a wide area network (WAN), a public switched telephone network (PSTN), a cellular network, a voice over internet protocol (VoIP) network, and the like. Account owner 110 may communicate with financial institution 130 by phone, email, instant messaging, facsimile, and the like.

In one contemplated embodiment, network 120 is a publicly accessible network such as the Internet, which can presently be accessed from many private residences and many public places such as college campuses, airports, coffee shops, and restaurants throughout the United States as well as many other countries of the world. A variety of technologies are available to establish secure connections over such a public network, so that data transmitted between computer 111 and a server 131 associated with the institution 130 remains either inaccessible or indecipherable by third parties that may intercept such data. The invention may make use of any such security technologies.

Financial institutions 130, 140 and 150 may communicate with each other via a network 125. Network 125 may be a publicly accessed network such as 120. Alternatively, network 125 may have certain characteristics that differ from network 120, due to the different requirements of bank-to-bank communications. For example, one might envision certain security features and access restrictions being more important in bank-to-bank communications.

In an embodiment, account owner 110 may wish to deposit a check that is drawn from account 170 at financial institution 150. Account owner 110 may deposit the check into account 160 by converting the check into electronic data and sending the data to financial institution 130. Aspects of the invention may thus comprise systems and methods carried out by the account owner 110 and his computer 111. Aspects of the invention may also comprise systems and methods carried out by the financial institution 130 and their server 131 or other electronics that facilitate and enable such deposit by the account owner 110.

For example, account owner 110 may convert the check into a digital image by scanning the front and/or back of the check using image capture device 112. Account owner 110 may then send the image to financial institution 130 using the systems and methods described herein. Please refer to FIG. 2 and corresponding description for a detailed exemplary embodiment of systems and methods for facilitating and processing a check deposit transaction. Upon receipt of the image, financial institution 130 may credit the funds to account 160. Financial institution 130 may clear the check by presenting the digital image to an intermediary bank, such as a regional branch of the Federal Reserve, a correspondent bank and/or a clearinghouse bank.

For example, the check may be cleared by presenting the digital image to financial institution 140, which may be a regional branch of the Federal Reserve, along with a request for payment. Financial institution 130 and 150 may have accounts at the regional branch of the Federal Reserve. As will be discussed in greater detail below, financial institution 130 may create a substitute check using the image provided by account owner 110 and present the substitute check to financial institution 140 for further processing. Upon receiving the substitute check, financial institution 140 may identify financial institution 150 as the paying bank (e.g., the bank from which the check is drawn). This may be accomplished using a nine-digit routing number located on the bottom left hand corner of the check. A unique routing number is typically assigned to every financial institution in the United States. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that an embodiment is not limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check may be cleared internally.

Figure 2:
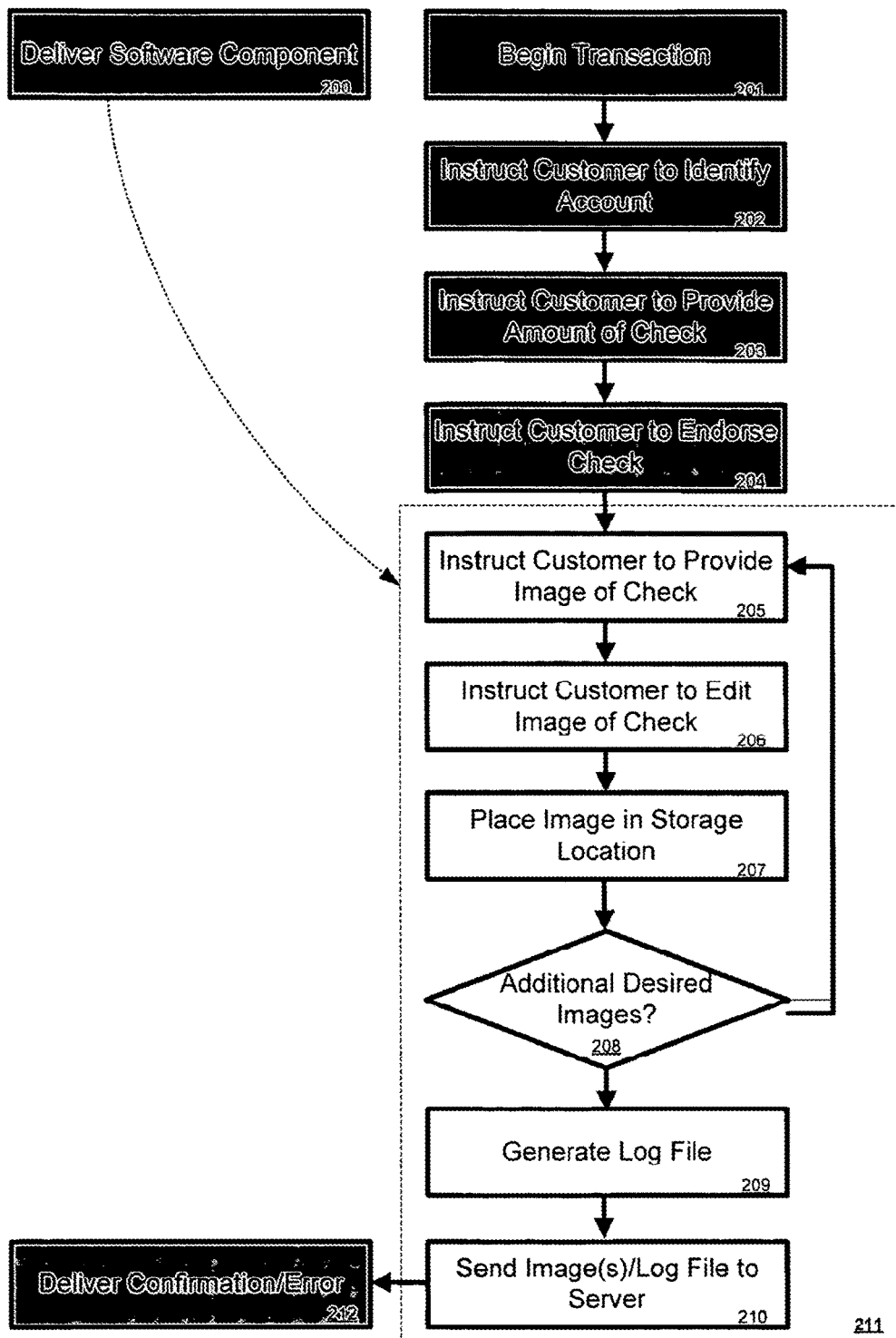
FIG. 2 illustrates a method for facilitating deposit of a check from a customer-controlled general purpose computer.

FIG. 2 illustrates a method for facilitating deposit of a check from a customer-controlled general purpose computer. The various steps of FIG. 2 may be viewed as performed by a server computer associated with a financial institution, in conjunction with a software component that operates from a customer-controlled general purpose computer. Various of the steps are contemplated as performed by the server, while various other steps are contemplated as performed by the software component.

In the embodiment illustrated in FIG. 2, the darker boxes indicate steps that are performed by the server, for example by delivering information to the user through the user's browser application. Making information available on a server to customers with a browser is considered to be effectively "delivering" such information for the purposes of this document. The lighter boxes inside 211 indicate steps that are performed by the software component, as it executes on the customer computer. Those of skill will recognize that alternative configurations are readily achievable by moving functions from server to software component or vice-versa.

The server may first deliver a software component to the customer-controlled general purpose computer 200. This may be done in response to a customer request for the capability of making deposits from his computer. In one embodiment, the financial institution may provide such capability only to customers that meet predetermined criteria of trustworthiness. For example, it can be required that the customer's accounts are in good standing, that the customer relationship has lasted a predetermined amount of time, that the customer has a predetermined number of financial service products with the financial institution (e.g. bank accounts, mortgages, insurance policies, etc.), that the customer has a predetermined level of assets with the financial institution, and so forth.

The software component may be configured to facilitate the deposit transaction in a variety of ways as illustrated herein. In one embodiment, the software component may be compatible with the JAVA® or .NET® technologies described above. Such configurations allow for widespread dissemination and successful operation in a wide variety of computing environments as may exist on customer-controlled general purpose computers.

Where the software component is written for JAVA®, .NET®, or any other such technology, it is useful in step 200 to first determine whether the customer-controlled general purpose computer has an appropriate virtual machine application installed, e.g. JAVA® Virtual Machine (JVM) or .NET® framework. If the computer does not have the appropriate application installed, such application may be automatically installed, or the customer may be directed to a location from which such application may be downloaded and installed. The software component may then be delivered 200, and should work as intended. The various other steps of FIG. 2 may now take place, or may take place at some subsequent time using the software component as previously downloaded.

After downloading or otherwise accepting the software component, and assuming the customer has an appropriate image capture device, the customer now has the capability to make deposits from his general purpose computer. For example, the customer points his browser to a bank website, where a link may be available that causes the bank server to initiate a deposit transaction 201. The customer may be asked to log in using a user name and password.

The customer may next be instructed to identify an account into which the deposit will be made 202. This can be done, for example, by providing a webpage that lists the available accounts, along with an instruction to select an account. Alternatively, a box may be provided into which the customer may type an account number, along with an appropriate instruction to type the number of the desired account. The account may be any account, and need not necessarily be the customer's own account, although it is contemplated that a large number of customer deposits may be made into the transacting customer's account, and embodiments may find it useful to restrict the allowed accounts to the customer's own accounts. In such embodiments, if the customer has just one account with the financial institution, step 202 may be eliminated because the only available allowed account would be the customer's single account.

The customer may next be instructed to identify an amount of a check or other negotiable instrument he wishes to deposit into the selected account 203. In one embodiment, this can be done similarly to step 202 by providing a webpage with a box into which the customer may type an amount, along with an appropriate instruction to type the amount of the check. The customer may also be instructed to endorse the check 204.

The customer may next be instructed to provide an image of a front side of a check 205, for example, by using an image capture device. In one embodiment, the customer may be instructed to place the check face down on a flatbed scanner, and may further be instructed as to the location and orientation of the check on the scanner. If the customer is instructed to take a digital photograph of the check using a digital camera, the customer may be instructed as to the position and orientation of the check, lighting, angle of camera, distance and focal length (zoom) of camera, and so forth. The software component may be useful at this point in providing a graphical illustration of just how the customer should provide the image. The customer may further be given instructions as to how to activate the image capture device and/or move the image from the device to the general purpose computer.

In one embodiment, it is contemplated that the software component allows for control of the transaction and transaction data throughout the various aspects thereof. For example, the software component may open a folder in a storage location, such as the hard drive of the general-purpose computer, and may work in conjunction with any software that interfaces with the image capture device to deposit the image in such folder. This may advantageously be conducted in a secure manner to prevent any unwanted image diversion or tampering. The hard drive of the general-purpose computer is considered to be a storage location that is controlled by said customer-controlled general purpose computer, but other storage locations such as disk drives, networked drives, and so forth may also be effectively controlled by the general purpose computer.

The software component may itself perform operations such as opening a folder and placing the images therein, or may effectively achieve such operations by instructing the customer and/or other applications to do so. All software operates to some extent under the control and with the support of an operating system running on the general purpose computer, and such support is of course appropriate in embodiments of the invention.

The software component may next cause the image of the check to be presented to the customer for editing, e.g. by asking the customer to crop and/or rotate the check image to a predetermined orientation 206. In embodiments using a scanner, an image of the entire scanner bed, or some otherwise too large image may be generated. If the check was placed in the top left corner of the scanner bed, the customer may be asked to indicate the bottom right corner of the check image, and the image may be cropped to contain only the check image, thereby removing a portion of the originally obtained image.

An appropriately edited image of the check may be placed in the storage location 207. If further images are necessary 208, steps 205-207 may be repeated as necessary. For example, the customer may be instructed to endorse and provide an image of the back side of a check. To ensure the check is appropriately voided, the customer may be asked to write "void" on the check and re-scan the front of the check.

A log file may be generated 209 to collect data for processing or troubleshooting the deposit transaction. The log file is discussed further in connection with FIGS. 4 and 5. The log file may be placed in the storage location along with the various images of the check.

Once the desired images are collected and edited, they may be delivered to the server for processing the deposit 210. The log file may also be delivered at this time. Once such files are delivered, they may be deleted from the customer's general purpose computer. If the server determines that the delivered images and any corresponding data are sufficient to go forward with the deposit, the customer's account may be provisionally credited, and a confirmation page may be delivered to the customer via the customer's browser application 212. The customer may be instructed to destroy, e.g. by shredding, the actual physical check or other negotiable instrument. Under the current check handling procedures in the United States, the physical check is not necessary in processing a deposit, nor is it necessary to keep the original check in bank or customer records.

Figure 3:
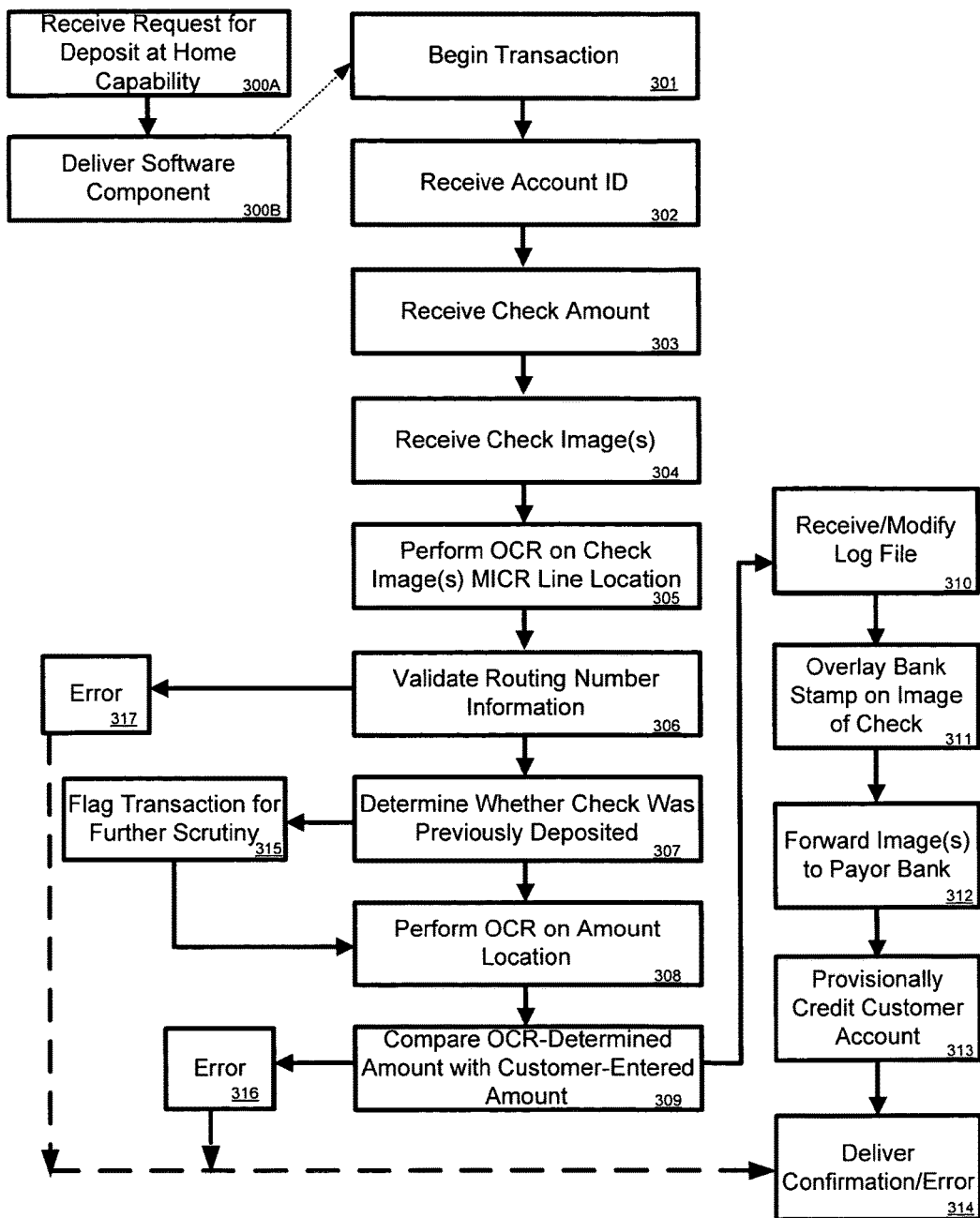
FIG. 3 illustrates a method for processing a check deposit.

FIG. 3 illustrates a method for processing a check deposit. The method of FIG. 3 is designed to complement that of FIG. 2 and to illustrate exemplary steps that may be carried out by a server or other electronics operated by a financial institution before, during, and after the various steps of FIG. 2 are carried out.

In general, as illustrated in FIG. 3, such server may receive a request for deposit at home capability 300A, and in response to such request may deliver a software component to the requesting customer 300B. As with FIG. 2, intermediate steps may comprise determining if the customer is in fact eligible for a remote deposit program, and ensuring the customer has an appropriate virtual machine environment installed on their general purpose computer—in embodiments where the software component requires such an environment.

A transaction may be initiated 301 upon receiving a customer indication that a deposit transaction is desired. The customer is instructed to identify an account per FIG. 2, and as a result the financial institution electronics receive an account identifier (ID) 302. Similarly, financial institution electronics receive check amount 303. At this juncture the software component handles image capture processes, which may or may not involve the server until such time as check image(s) are received 304.

Upon receipt of check images, an Optical Character Recognition (OCR) process may be invoked to determine certain information about the check. For example, OCR may be performed on the check's MICR line location 305 to determine information such as payor bank routing number, account number, and check number. The bank routing number may then be validated 306 against a list of valid routing numbers to ensure that it corresponds to a legitimate bank, and in some embodiments, to ensure it corresponds to a United States bank. In one embodiment, the OCR is conducted in real time, i.e. prior to confirming the deposit transaction for the customer, so as to validate some initial deposit information immediately, and thereby filter transactions that may result in errors were the OCR to be conducted at some later time. In other embodiments, certain efficiencies may be gained by performing "batch" OCR operations at some later time.

In one embodiment, an OCR process can conveniently be applied to an image of a back side of a check in addition to performing OCR on the image of the front side of said check. One problem that may occur involves customer submission of two front images, instead of one front image and one back image. OCR may be performed on a MICR line location of an alleged image of a back side of said check to confirm that said alleged image of a back side of said check does not bear a MICR line. If no MICR line is present in such location then it is more likely that the alleged image of a back side of said check is in fact the back, and not the front, of the check.

Another advantageous use of OCR is on the endorsement location on the back of a check. By performing OCR, it may be possible in some embodiments to determine that the signature matches that of the payor or drafter of the check. However, often signatures are illegible. Thus in one embodiment it is advantageous to determine that some mark or signature is present in the endorsement location on the back of the check, without conducting any further signature identification procedures.

If the routing number determined using OCR cannot be validated, an error may result 317, and the deposit transaction can be aborted. An error message can be delivered to the customer 314, explaining a reason that the transaction could not be processed.

A duplicate checking procedure may be carried out to determine whether the check was previously deposited 307. Determining whether a check is a duplicate can be processor- and memory-intensive, however, so this operation may be initially performed in a manner designed for speed and rough, if not complete, accuracy. More thorough duplicate detection may be performed after the deposit transaction is confirmed 314. For example, in one embodiment, an initial duplicate detection process may proceed as illustrated in FIG. 6.

Figure 6:
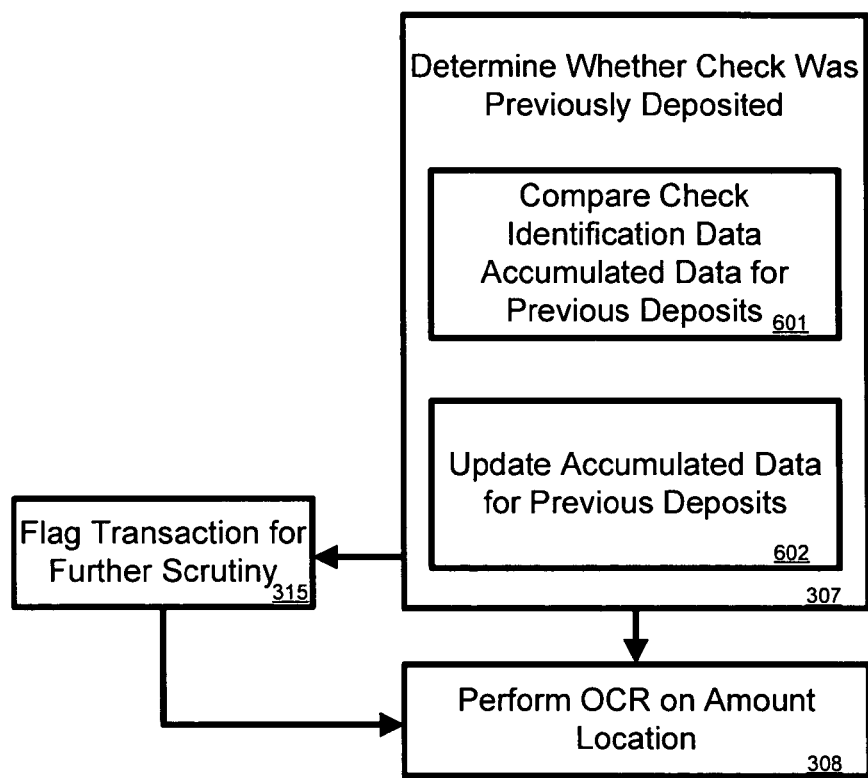
FIG. 6 illustrates an exemplary duplicate checking procedure.

FIG. 6 expands upon step 307 as illustrated in FIG. 3. To undertake at least an initial, provisional duplicate checking procedure, check identification data may be compared against accumulated data for previous check deposits 601. This may entail, for example, comparing check MICR line information against MICR lines for all checks deposited into the transacting customer's account for the previous two weeks. Other embodiments are also possible, for example one might ensure a MICR line does NOT comprise a money amount, because a money amount in a MICR line indicates a check was already deposited. On might scan for a return stamp on the front or back of the check. One might also look for a number 4 in position 44 of the MICR line. Placing a 4 in position 44 is only done when images of checks are made by banks. The fact that an image was made in general implies that the check was already presented to a bank, and therefore it may be advantageous to ensure the check was not presented twice.

According to step 602, if the check deposit proceeds, appropriate check identification data for the deposited check may be added to the accumulated data for previous deposits, so that it too will be available for use in subsequently identifying duplicate deposit attempts.

There are numerous possibilities for false positives in duplicate checking 307. Because of this, it is advantageous in some embodiments to proceed with a deposit transaction despite the fact that a duplicate may be initially identified. As illustrated in FIG. 3, if a duplicate is detected, the transaction may be flagged for further scrutiny 315 at a later time, and the transaction may be allowed to proceed. If a duplicate is not detected, the transaction need not be flagged as abnormal and step 315 is unnecessary.

Returning to FIG. 3, OCR may further be performed on a check amount location 306, and the amount as determined using OCR may be compared against the customer-entered amount received pursuant to step 303. If the amounts do not match, an error 316 can result, terminating the transaction and delivering appropriate information concerning the error to the customer 314. OCR may further be performed on any other aspects of the check image at this time if it is advantageous in specific embodiments to do so.

The server may further receive and modify a deposit transaction log file 310. Alternative versions of the images received may be generated an placed in the log file. Check 21 regulations require a bi-tonal TIFF formatted image, which is generally a low-quality image format as compared to other available image formats. Therefore, it is desirable in some embodiments to retain both a "good" image in an initial format, e.g., in a JPEG format, as well as the modified bi-tonal TIFF required by Check 21. This way, if any troubleshooting is necessary, a good image of the check remains available.

In some embodiments, a bank stamp may be overlaid on the image of the back of the check 311, just as if the check was physically deposited at a bank. Appropriate images may be forwarded to the payor bank for payment 312, and meanwhile, the customer's account may be provisionally credited in the amount of the check 313. A confirmation can be delivered to the customer 314.

At 312, in one embodiment, the bank may forward an image or images to a payor bank. Provisionally crediting the customer account 513 and delivering a confirmation to the customer-controlled general purpose computer 514 may be done before, after, or contemporaneously with step 312. In general, a provisional credit is subject to the check clearing, e.g., by receiving at the payee bank some confirmation that the check will be satisfied from the payor bank. This confirmation from the payor bank can take some time. Provisionally crediting the customers account 513 and sending the confirmation 514 can assure the customer that the transaction will proceed, even though it may not ultimately be successful.

In one embodiment, forwarding an image or images to a payor bank 512 may be performed pursuant to an Automated Clearinghouse (ACH) transaction. ACH transactions typically include payment instructions to debit and/or credit an account. Banks often employ ACH service providers to settle ACH transactions. Examples of ACH service providers include regional branches of the Federal Reserve and the Electronic Payments Network (EPN).

In an ACH transaction, the payee's (customer's) bank may be referred to as the originating depository financial institution (ODFI). Upon receipt of appropriate check information, the payee's bank may credit funds to the payee's account and generate an ACH debit entry to the payor's account, which may be presented to the ACH service provider for processing.

The ACH service provider may process the debit entry by identifying the account and bank from which the check is drawn. The bank from which the check is drawn (i.e., the payor's bank) may be referred to as a receiving depository financial institution (RDFI). If the payor's bank verifies the transaction, the ACH service provider may settle the transaction by debiting the payor's bank and crediting the payee's bank. The payor's bank may then debit the payor's account.

A substitute check is typically a paper reproduction of an original check and may be the legal equivalent of the original check. Substitute checks were authorized under The Check Clearing for the 21st Century Act, commonly known as Check 21. The Act was enacted to facilitate the check clearing process by allowing banks to transmit electronic images of checks (e.g., substitute checks) to other banks rather than physically sending the original paper checks. Check 21 does not require that banks use substitute checks. In fact, many banks may have voluntary agreements to accept certain electronic images of checks even though the images may not qualify as substitute checks under Check 21. If a bank does not have a voluntary agreement and/or refuses to accept an electronic image, the financial institution is required under Check 21 to accept a substitute check in lieu of the original check.

The bank may process the ACH debit entry, substitute check, and/or electronic image. As noted above, the bank may present the ACH debit entry to an ACH service provider (e.g., EPN), which may be responsible for settling the transaction between the payee's bank and the payor's bank. The bank also may convert the digital image into a substitute check and present the substitute check to an intermediary bank (e.g., a regional branch of the Federal Reserve) to complete the check clearing process. If the payor's bank and the payee's bank are the same, the transaction can be handled internally at the payor bank by simply debiting the account of one customer and crediting the account of another. Thus, an intermediate step may comprise identifying if the payor bank and the payee bank are one and the same, or otherwise operating in a closely cooperative manner.

Figure 4:
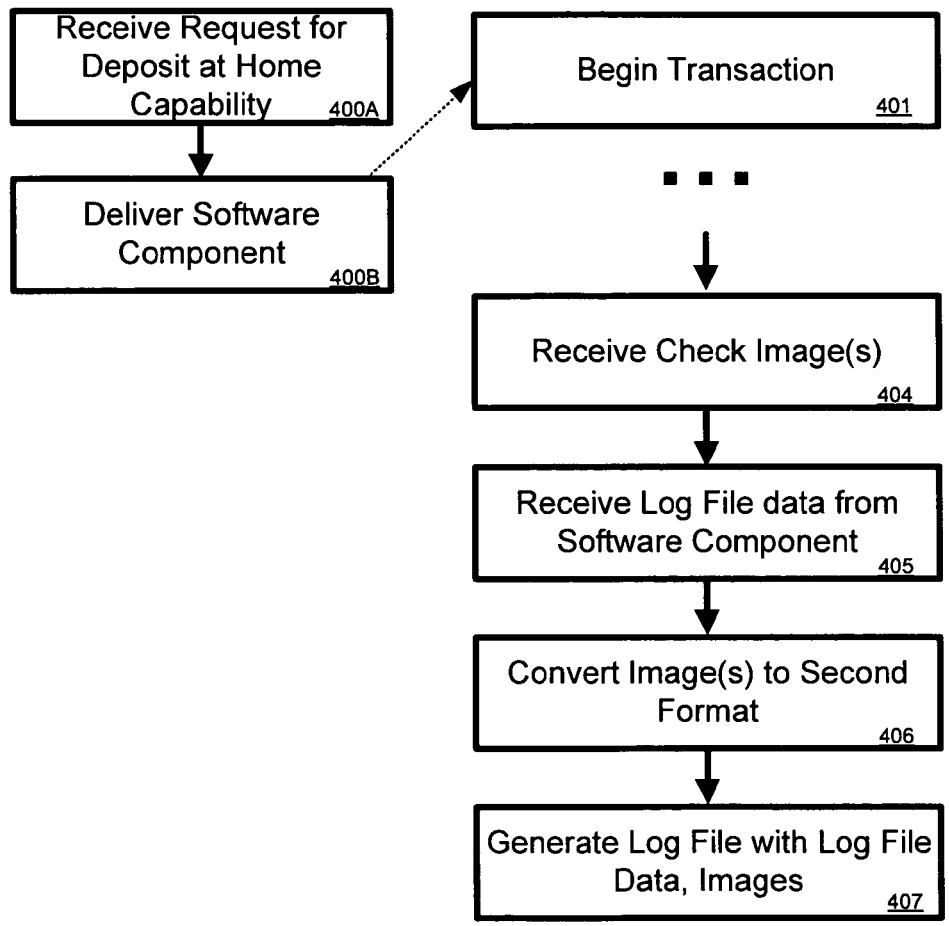
FIG. 4 illustrates a method for processing check deposits, with particular applicability to generation and use of an appropriate log file.
Figure 5:
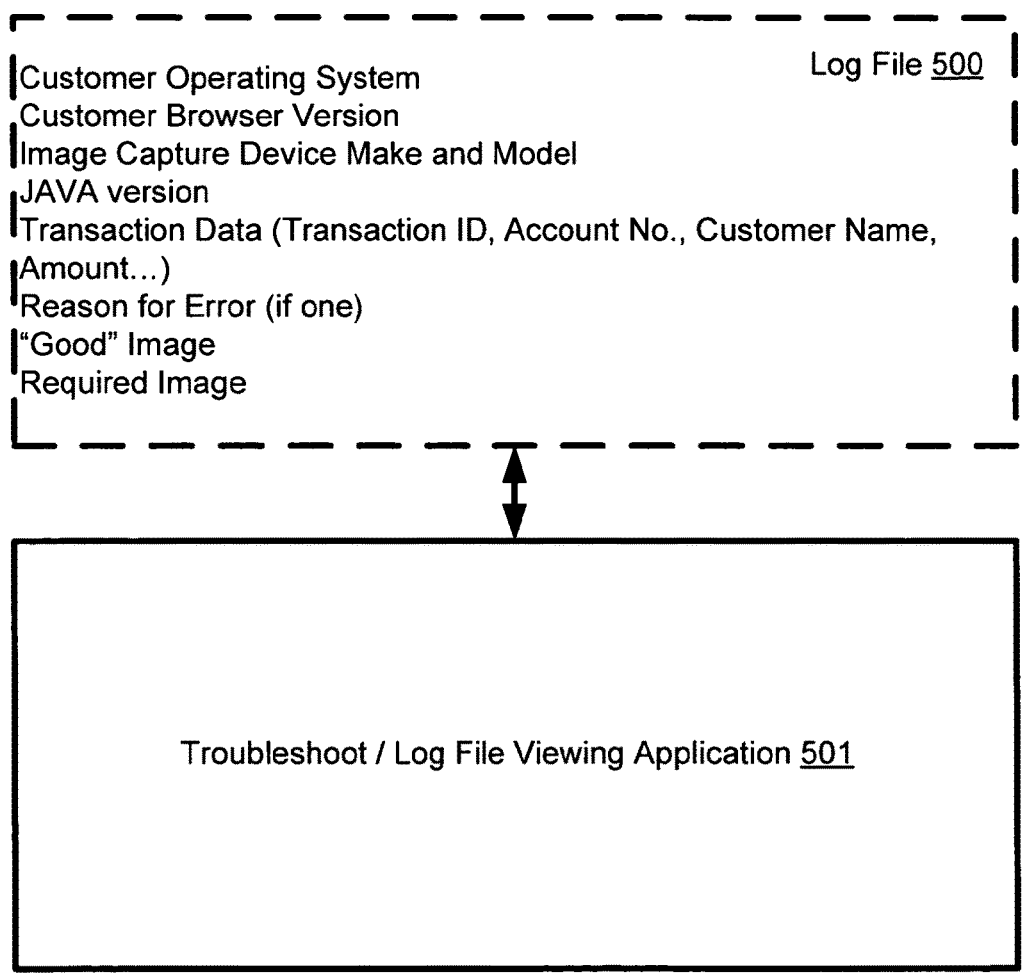
FIG. 5 illustrates an exemplary log file and log file viewing application.

FIGS. 4 and 5 are directed to methods for processing check deposits, with particular applicability to generation and use of an appropriate log file. With reference to FIG. 4, a bank server and/or related electronics can receive a request for "deposit at home" or remote deposit capability 400A, and deliver a software component to a customer's general purpose computer 400B as described above. In general, a transaction may begin 401 and proceed as described with regard to FIGS. 2 and 3. The three dots in FIG. 4 are a general reference to steps of a deposit transaction that may occur. In the course of such transaction, a log file maybe generated, for example by a software component on a customer-controlled general purpose computer. The log file comprises log file data, and may be delivered to the server by the software component. Log file data may comprise, for example the data illustrated in the log file 500 in FIG. 5.

In one embodiment, a financial institution server may receive one or more check images 404, and may receive log file data from the software component 405. Other embodiments are will be readily recognized as possible, such as placing the images in the log file and combining steps 404 and 405, or streaming raw data absent any sort of file structure, and allowing the server to generate a file upon receipt of such data.

Step 406 comprises converting an image from a first format to a second format. In one embodiment, the first format is, for example, a relatively high-quality Joint Photographic Experts Group (JPEG) format, such as might be initially generated by the image capture device used by a customer in producing the check image. Due to its high quality, such an image provides a good tool for subsequently troubleshooting a deposit transaction. For example, it might be readily determined if the image represents a check that was previously deposited by simple human inspection of both images.

The second format is, in one embodiment, a format that complies with bank-to-bank image transfer requirements.

Currently, the image format required by Check 21 is the bi-tonal Tag Image File Format (TIFF). Therefore the second format may be, for example, a bi-tonal Tag Image File Format (TIFF).

In a further embodiment, the images in both formats can be retained, for example, in the log file. Each image is useful for its own purpose—the first for troubleshooting, the second for regulatory compliance and business necessity. Thus, step 407 illustrates generating a log file with log file data and images. The term "generating" may be exchanged for "modifying" in some embodiments, e.g. where the log file was received from the software component, and simply modified to further comprise an additional check image that is in a different format. The generating step 407 may be broken into a plurality of steps, each step for generating an aspect of log file 500 in FIG. 5.

Referring now to FIG. 5, an exemplary log file 500 is illustrated and examples of data that may be placed in the log file 500 are listed. In general, a log file can advantageously comprise an identification of an image capture device used to generate an image of a check, for example a scanner make and model, digital camera make and model, or other identification information such as an image capture device Global Unique Identifier (GUID). This identification information may also include an identification of software associated with the device, for example the familiar TWAIN drivers that can be used with scanners, digital cameras, and other image capture devices.

Furthermore, with regard to log file 500, a customer operating system can comprise an identification of the operating system used by the customer's general purpose computer. A customer browser version can comprise the browser used by the customer's general purpose computer. Image capture device make and model may comprise the type of image capture device, manufacturer, and model number. "JAVA version" may comprise a version of the JAVA virtual machine software used by the customer's general purpose computer, or, if .NET technologies are used, the version of the .NET Framework. Transaction data may comprise information such as transaction ID, account number, customer name, amount of deposit, check routing number, check number, check account number, and so forth. Reason for error may be provided if an error occurred—for example, due to an invalid check routing number, different amounts identified by the customer and the OCR process, etc. Finally, the "good" image (customer generated image) and the "required" image (required for bank-to-bank image transfer) may also be included.

The log file 500 may be consumed by a troubleshooting or log file viewing application 501. Such an application may be provided to financial institution employees to view log files and solve problems associated with particular deposits. The application 501 may also collect statistical information and the like regarding all log files.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the processing of the disclosed embodiments.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A system comprising:
a memory; and
a processor in communication with the memory, the processor configured to:
establish a secure connection over a communication network with a remote user device;
receive an image of a check captured by an image capture device coupled to the remote user device over the secure connection, wherein the image of the check is in a first data format;
perform optical character recognition on the image of the check to determine information about the check, including optical character recognition of a Magnetic Ink Character Recognition (MICR) line in the image of the check, wherein the determined information includes MICR line information;
generate a supplemental image of the check in a second data format from the image of the check in the first data format, wherein an image quality of the check in the first data format is higher than an image quality of the check in the second data format and the second data format is a bi-tonal format;
store both the image of the check and the supplemental image of the check in a log file;
store the information about the check in the log file;
access the log file; and
deposit the check into a customer account based, at least in part, on the image of the check, the supplemental image of the check, and the information accessed from the log file.

2. The system of claim 1, wherein data communicated over the secure connection is inaccessible, indecipherable, or both by third parties.

3. The system of claim 1, wherein the processor is further configured to:
transmit a confirmation message over the secure connection indicating that the customer account has been credited in an amount corresponding to the determined information obtained by the optical character recognition performed on the image of the check.

4. The system of claim 3, wherein the processor is configured to:
perform optical character recognition in real-time; and
validate the determined information about the check before the confirmation message is transmitted over the secure connection.

5. The system of claim 3, wherein the processor is further configured to:
perform an initial duplicate detection procedure based on the determined information about the check before the confirmation message is transmitted over the secure connection; and
perform a complete duplicate detection procedure after the confirmation message is transmitted over the secure connection.

6. A method comprising:
establishing a secure connection over a communication network with a remote user device;
receiving an image of a check captured by an image capture device coupled to the remote user device over the secure connection, wherein the image of the check is in a first data format;
performing optical character recognition on the image of the check to determine information about the check, including optical character recognition of a Magnetic Ink Character Recognition (MICR) line in the image of the check, wherein the determined information includes MICR line information;
generating a supplemental image of the check in a second data format from the image of the check in the first data format, wherein an image quality of the check in the first data format is higher than an image quality of the check in the second data format and the second data format is a bi-tonal format;
storing both the image of the check and the supplemental image of the check in a log file;
storing the information about the negotiable instrument in the log file;
accessing the log file; and
depositing the check into a customer account based, at least in part, on the image of the check, the supplemental image of the check, and the information accessed from the log file.

7. The method of claim 6, wherein data communicated over the secure connection is inaccessible, indecipherable, or both by third parties.

8. The method of claim 6, further comprising:
transmitting a confirmation message over the secure connection indicating that the customer account has been credited in an amount corresponding to the determined information obtained by performing optical character recognition on the image the check.

9. The method of claim 8, wherein performing optical character recognition occurs in real-time and further comprising:
validating the determined information about the check before the confirmation message is transmitted over the secure connection.

10. The method of claim 8, further comprising:
performing an initial duplicate detection procedure based on the determined information about the check before the confirmation message is transmitted over the secure connection; and
performing a complete duplicate detection procedure after the confirmation message is transmitted over the secure connection.

11. The system of claim 5, wherein:
in performing the initial duplicate detection procedure, the processor is further configured to analyze the MICR information associated with the MICR line of the negotiable instrument to determine whether the MICR line of the check comprises a money amount.

12. The system of claim 11, wherein in performing the initial duplicate detection procedure the processor is further configured to:
in response to a determination that the MICR line of the check comprises a money amount, provisionally detect a duplicate deposit of the check.

13. The system of claim 5, wherein:
in performing the initial duplicate detection procedure, the processor is further configured to analyze the MICR information associated with the MICR line of the check to determine whether a predetermined character is included in a predetermined position of the MICR line of the check.

14. The system of claim 13, wherein in performing the initial duplicate detection procedure the processor is further configured to:
in response to a determination that the predetermined character is included in the predetermined position of the MICR line of the check, provisionally detect a duplicate deposit of the check.

15. The system of claim 14, wherein:
in performing the initial duplicate detection procedure, the processor is further configured to compare the MICR information associated with the MICR line of the check with respective MICR information of each check deposited into the customer account within a predetermined time period.

16. The method of claim 10, wherein:
the performing of the initial duplicate detection procedure further comprises analyzing the MICR information associated with the MICR line of the check to determine whether the MICR line of the check comprises a money amount.

17. The method of claim 16, wherein the performing of the initial duplicate detection procedure further comprises:
in response to a determination that the MICR line of the check comprises a money amount, provisionally detecting a duplicate deposit of the check.

18. The method of claim 10, wherein:
the performing of the initial duplicate detection procedure further comprises analyzing the MICR information associated with the MICR line of the check to determine whether a predetermined character is included in a predetermined position of the MICR line of the check.

19. The method of claim 18, wherein the performing of the initial duplicate detection procedure further comprises:
in response to a determination that the predetermined character is included in the predetermined position of the MICR line of the check, provisionally detecting a duplicate deposit of the check.

20. The method of claim 19, wherein:
performing the initial duplicate detection procedure further comprises comparing the MICR information associated with the MICR line of the check with respective MICR information of each check deposited into the customer account within a predetermined time period.

* * * * *